(12) United States Patent
Fox et al.

(10) Patent No.: US 11,779,893 B2
(45) Date of Patent: Oct. 10, 2023

(54) BEVERAGE DISPENSING SYSTEM AND METHOD

(71) Applicant: Pnu Corp., Colorado Springs, CO (US)

(72) Inventors: Tyler Logan Fox, Colorado Springs, CO (US); David Thomas Melin, Colorado Springs, CO (US); Robert Eugeniusz Regent, Boise, ID (US); Addie Elizabeth White, Boise, ID (US); Brennar Thomas Schindel, Boise, ID (US)

(73) Assignee: Pnu Corp., Colorado Springs, CO (US)

( * ) Notice: Subject to any disclaimer, the term of this patent is extended or adjusted under 35 U.S.C. 154(b) by 0 days.

(21) Appl. No.: 18/111,442

(22) Filed: Feb. 17, 2023

(65) Prior Publication Data

US 2023/0264158 A1 Aug. 24, 2023

Related U.S. Application Data

(60) Provisional application No. 63/311,993, filed on Feb. 19, 2022.

(51) Int. Cl.
*B01F 35/83* (2022.01)
*B67D 1/00* (2006.01)
(Continued)

(52) U.S. Cl.
CPC ........... *B01F 35/831* (2022.01); *A47J 31/005* (2013.01); *A47J 43/27* (2013.01); *B01F 25/105* (2022.01); *B01F 33/50111* (2022.01); *B01F 35/754* (2022.01); *B65D 43/0225* (2013.01); *B65D 53/02* (2013.01); *B65D 81/3222* (2013.01); *B67D 1/0015* (2013.01); *B67D 1/0046* (2013.01); *C12G 3/04* (2013.01); *B01F 2025/916* (2022.01); *B01F 2101/16* (2022.01)

(58) Field of Classification Search
CPC .................. B01F 35/831; B01F 25/105; B01F 33/50111; B01F 35/754; B01F 2025/916; B01F 2101/16; A47J 31/005; A47J 43/27; B65D 43/0225; B65D 53/02; B65D 81/3222; B67D 1/0015; B67D 1/0046; C12G 3/04
See application file for complete search history.

(56) References Cited

U.S. PATENT DOCUMENTS 661,249 A 11/1900 Leggett
2,991,944 A 7/1961 Sullivan
(Continued)

FOREIGN PATENT DOCUMENTS

| CN | 102245496 B | 5/2015 |
| EP | 2236212 A1 | 10/2010 |
| WO | 2002074390 A1 | 9/2002 |

*Primary Examiner* — Frederick C Nicolas
(74) *Attorney, Agent, or Firm* — Stephen B. Katsaros; Patent Engineering, LLC

(57) ABSTRACT

A beverage dispensing system is disclosed that includes a container assembly configured to store two liquids (e.g., liquor and a mixer) that is couplable to a head assembly. The head assembly includes one or more pumps configured to draw the different liquids from the assembly, to mix variable ratios of the two liquids together, and to dispense the drink. In some configurations, the drink may be dispensed from the beverage dispenser into a glass or directly to the mouth of an individual.

18 Claims, 28 Drawing Sheets

(51) Int. Cl.
  *B65D 81/32* (2006.01)
  *B01F 35/75* (2022.01)
  *B65D 43/02* (2006.01)
  *B01F 25/00* (2022.01)
  *B01F 33/501* (2022.01)
  *A47J 43/27* (2006.01)
  *B65D 53/02* (2006.01)
  *A47J 31/00* (2006.01)
  *C12G 3/04* (2019.01)
  *B01F 101/16* (2022.01)

(56) References Cited

U.S. PATENT DOCUMENTS

| | | | |
|---|---|---|---|
| 3,727,800 A | 4/1973 | Santos | |
| 5,143,261 A | 9/1992 | Drobish | |
| 5,152,429 A | 10/1992 | Billings | |
| 5,325,996 A | 7/1994 | Bannigan | |
| 5,562,250 A | 10/1996 | O'Neill | |
| 5,607,072 A | 3/1997 | Rigney et al. | |
| 5,713,491 A | 2/1998 | Hughes et al. | |
| 6,460,735 B1 * | 10/2002 | Greenwald | A47J 31/467 |
| | | | 222/145.5 |
| 6,540,112 B1 | 4/2003 | Studnik | |
| 7,147,172 B2 | 12/2006 | Darling, III et al. | |
| 8,434,646 B2 | 5/2013 | Saveliev et al. | |
| 8,875,874 B2 | 11/2014 | Helou | |
| 8,973,847 B2 | 3/2015 | Iammatteo et al. | |
| D751,178 S | 3/2016 | Gibson | |
| 9,346,607 B2 | 5/2016 | Madjar | |
| 9,364,109 B2 | 6/2016 | Paukovits et al. | |
| 9,930,980 B2 | 4/2018 | Pau | |
| 9,986,872 B2 | 6/2018 | Shalvi et al. | |
| 10,328,398 B2 | 6/2019 | Hubmann et al. | |
| 10,674,857 B2 | 6/2020 | Lyons et al. | |
| 10,684,630 B1 | 6/2020 | Ciarlante | |
| 10,889,482 B1 * | 1/2021 | Maclean | A47J 43/27 |
| 11,242,236 B2 * | 2/2022 | LaBarbera | B01F 35/883 |
| 11,492,191 B2 | 11/2022 | Klein | |
| 11,627,838 B1 * | 4/2023 | Litman | B01F 35/883 |
| | | | 222/145.5 |
| 2001/0023900 A1 | 9/2001 | Stewart et al. | |
| 2006/0061985 A1 | 3/2006 | Elkins | |
| 2008/0142548 A1 * | 6/2008 | Moen | B67D 1/04 |
| | | | 137/9 |
| 2010/0019062 A1 | 1/2010 | Clarke | |
| 2010/0024660 A1 | 2/2010 | Wallace | |
| 2011/0163127 A1 * | 7/2011 | Dibella-Lenaway | A47J 31/401 |
| | | | 222/145.6 |
| 2014/0303790 A1 | 10/2014 | Huang et al. | |
| 2015/0182797 A1 | 7/2015 | Wernow et al. | |
| 2016/0143583 A1 | 5/2016 | Jeukendrup et al. | |
| 2016/0270600 A1 * | 9/2016 | Pappas | A47J 43/27 |
| 2017/0340147 B1 | 11/2017 | Hambrock et al. | |
| 2022/0218137 A1 | 7/2022 | Iverson et al. | |

* cited by examiner

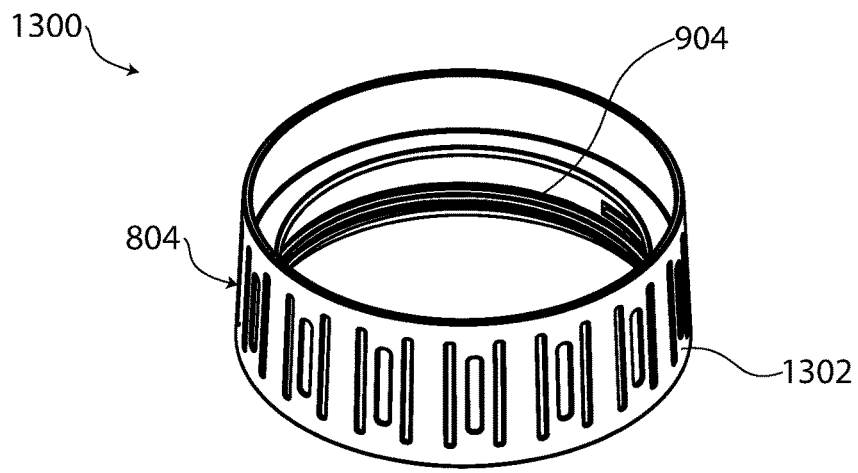
FIG. 13
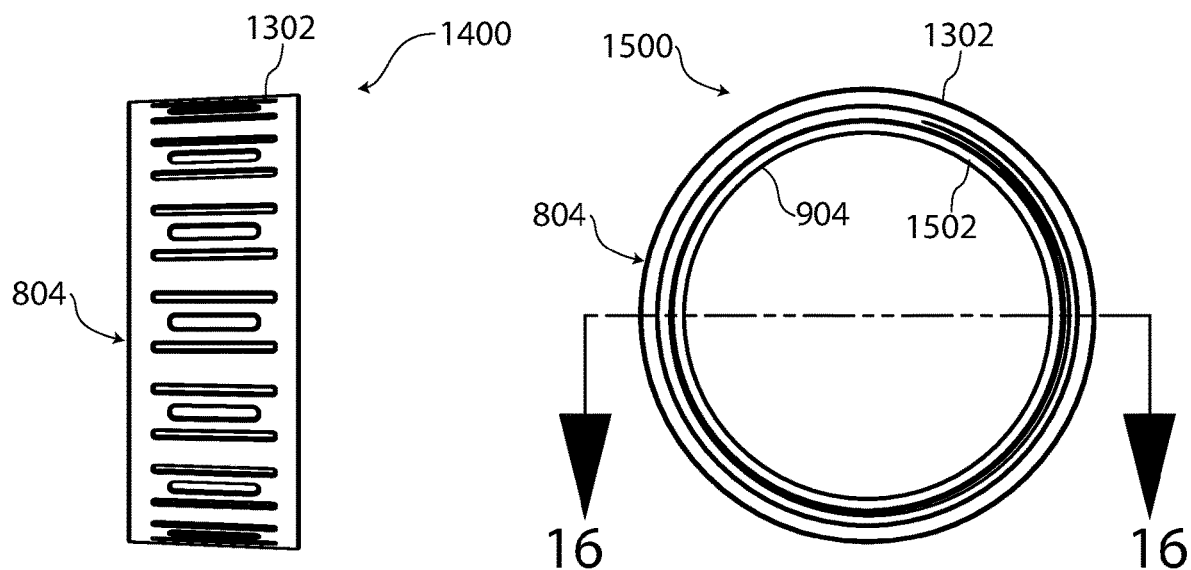
FIG. 14
FIG. 15
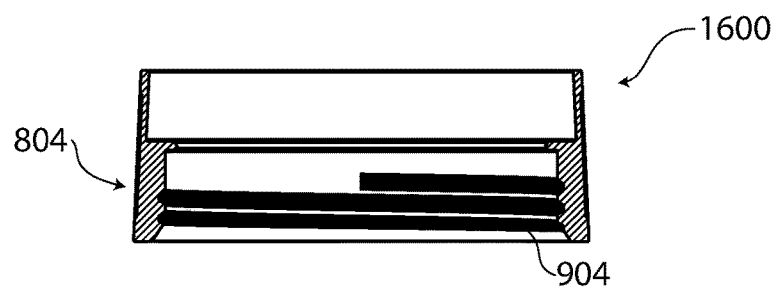
FIG. 16

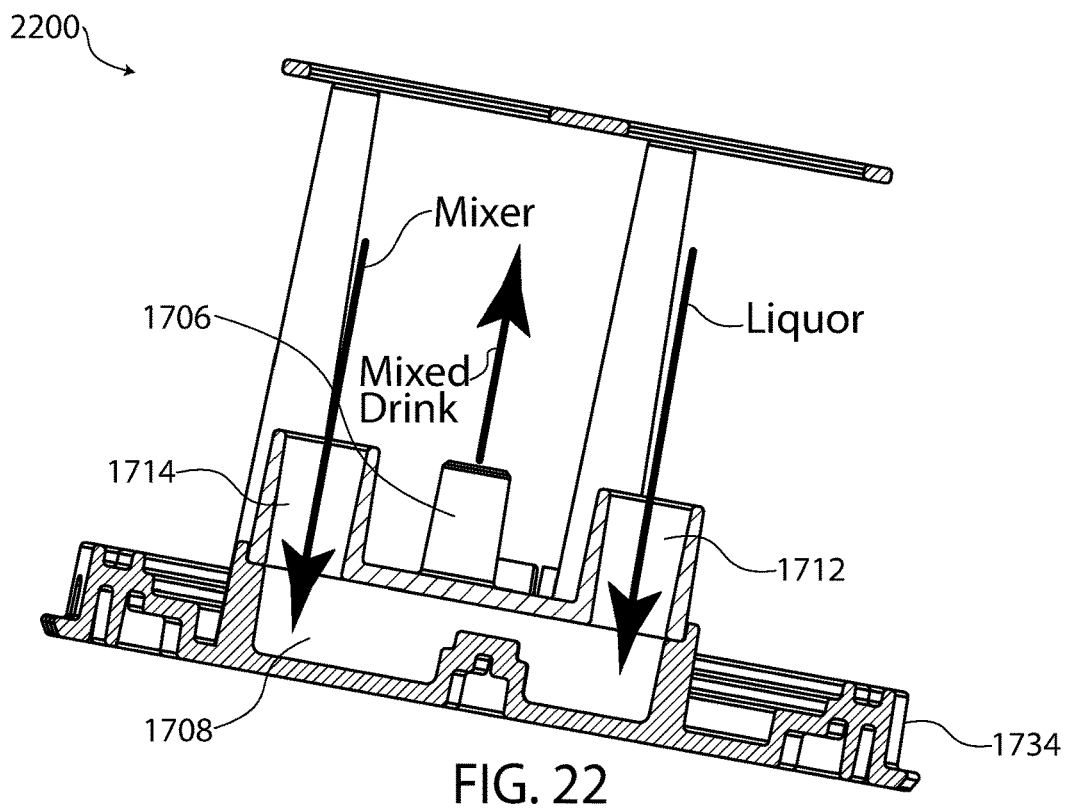
FIG. 22
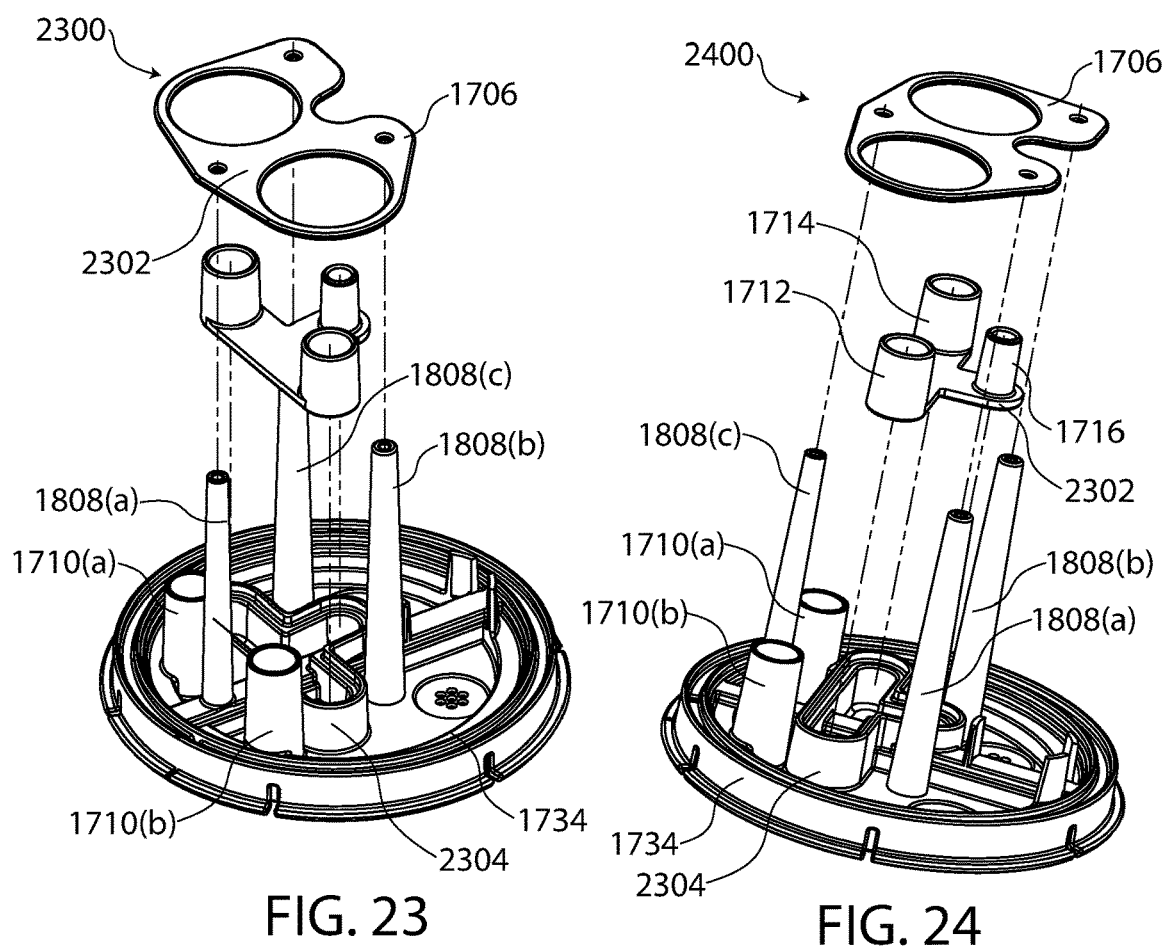
FIG. 23
FIG. 24

BEVERAGE DISPENSING SYSTEM AND METHOD

CROSS REFERENCE TO RELATED APPLICATIONS

The present application claims priority to U.S. Patent Application Ser. No. 63/311,993, filed on Feb. 19, 2022, entitled "HANDHELD MULTI-RESERVOIR BEVERAGE MIXING AND DISPENSING APPARATUS WITH DILUTION CONTROL", which is hereby expressly incorporated by reference in its entirety for all purposes.

TECHNICAL FIELD

This disclosure pertains generally, but not by way of limitation, to systems and methods for dispensing a beverage. More particularly, this disclosure relates to systems and methods for creating and dispensing a beverage which may be a mixture of liquor and a mixer.

BACKGROUND

Making cocktails and mixed alcoholic or non-alcoholic drinks (referred to in combination simply as "mixed drinks") is a common and widespread activity. However, the ability to mix various drink components, alcoholic or nonalcoholic, in a way that creates a beverage that consistently tastes good is difficult enough to be considered an art, referred to as 'mixology.' It requires enough training and practice to obtain skilled proficiency that mixology is taught in expensive trade schools. Those who have dedicated the time and other resources to master this skill are revered as skilled mixologists.

For the average mixed-drink consumer, it is difficult to prepare, share, and enjoy high quality custom drinks in private, non-retail environments. Most individuals do not have the experience or skill to make a wide variety of mixed drinks correctly. If they are making drinks for all their guests or attendees to a private event, the host or amateur 'bartender' is burdened by making drinks rather than enjoying the event. Consequently, the drinks are often of sub-par quality. Additionally, making individual mixed drinks in environments outside of a home bar or kitchen is difficult and messy without proper bar/kitchen utensils. Another option has been to make "batch" mixed drinks in volume which presents more difficulty in achieving proper ingredient proportions along with difficulty storing and dispensing the batch mixed drink. Melting ice rapidly dilutes the mix, damaging the quality and taste of the beverage. If the drink includes alcohol, the expensive alcohol may be wasted when too much beverage is made. The above applies to virtually all environments in which mixed drinks are consumed outside of a bar, restaurant, or entertainment venue.

SUMMARY

At least one method and a system of dispensing a drink, which may include a mixture of liquor and a mixer is illustrated. The system may include a beverage dispenser. The beverage dispenser may include a container assembly configured to store liquor and a mixer. The container assembly may be coupled to a head assembly. The head assembly may further include battery-operated one or more pumps (illustrated in detail in successive configurations) configured to draw liquor and a mixer from the assembly, to create the drink. Further, the drink may be dispensed from the beverage dispenser, either directly to the mouth of an individual, or into a vessel. While specific examples, configurations, and/or applications of the present beverage dispensers are provided, it is to be understood that granted claims ultimately define the breadth and depth of the present disclosure. The following example(s) are meant to illustrate the present beverage dispenser.

In one illustrative configuration of the present disclosure, a beverage dispenser is disclosed. The beverage dispenser may be configured to dispense a mixed drink of liquor and a mixer. The beverage dispenser may include a container assembly defining an opening. The container assembly may include a mixer chamber configured to store the mixer, and a liquor chamber inserted within the mixer chamber, which may be configured to store the liquor. The container assembly may further include a separator plate adjacent to the opening of the container assembly. The separator plate may further include a liquor fill hole in fluid communication with the liquor chamber, a liquor conduit defining a proximal end and a distal end oppositely disposed to the proximal end. The proximal end of the liquor conduit may be in fluid communication with the liquor chamber. The separator plate may further include a mixer fill hole in fluid communication with the mixer chamber, and a mixer conduit defining a proximal end and a distal end oppositely disposed to the proximal end. The proximal end of the mixer conduit may be in fluid communication with the mixer chamber. The beverage dispenser may further include a head assembly configured to be removably connected to the container assembly. The head assembly may further include a turbulator configured to combine the liquor and the mixer. The turbulator may include a liquor inlet, a mixer inlet, and a mixed drink outlet. The head assembly may include a liquor pump in fluid communication with the proximal end of the liquor conduit and the liquor inlet of the turbulator. The head assembly may also include a mixer pump in fluid communication with the proximal end of the mixer conduit and the mixer inlet of the turbulator, a nozzle in fluid communication with the mixed drink outlet, and an electronics circuit board in electrical communication with the liquor pump and the mixer pump. The electronics circuit board may further include a mix adjuster. The mix adjuster may be configured to adjust the ratio of the liquor and the mixer. The beverage dispenser may further include a battery configured to power the electronics circuit board, the liquor pump, and the mixer pump. The electronics circuit board may be configured to controllingly operate the liquor pump and the mixer pump to draw the liquor and the mixer from the liquor chamber and the mixer chamber, respectively, and combine the liquor and the mixer in the turbulator to create the drink and dispense the mixed drink from the nozzle.

In one configuration, a beverage dispenser container assembly for components of a mixed beverage is disclosed. The beverage dispenser container assembly may include a mixer chamber configured to store a mixer, the mixer chamber may further include a finish formed at an entrance of the mixer chamber and coaxial to a centerline. The finish may further include a sealing surface formed at the entrance of the mixer chamber, an external thread formed on an outside surface thereof, and a bore formed at the entrance and coaxial to the centerline. The beverage dispenser container may include a liquor chamber configured to store the liquor. The liquor chamber may further include a separator plate. Further, a liquor opening may be formed in the separator plate. Further, a seal may be adjoined to the separator plate of the liquor chamber and either the bore or the sealing surface of the mixer chamber. A head assembly may be attached to the beverage dispenser container and may include an internal thread engagingly coupled to the external thread of the mixer chamber, a cap adjoining the seal, and the liquor and the mixer separated by at least the liquor chamber and the seal.

In one configuration, a beverage creation method for creating a mixed drink of liquor and a mixer is disclosed. The beverage creation method may include the first step of providing a container assembly. The container assembly may include a mixer chamber configured to store the mixer. The mixer chamber may include an opening, a liquor chamber removably positioned in the mixer chamber, and the liquor chamber configured to store the liquor. The beverage dispenser may include a separator plate adjacent to the opening, and the separator plate may further include a liquor fill hole in fluid communication with the liquor chamber. The container assembly may further include a liquor conduit defining a proximal end, and a distal end oppositely disposed to the proximal end. The proximal end of the liquor conduit may be in fluid communication with the liquor chamber. The separator plate may further include a mixer fill hole which may be in fluid communication with the mixer chamber. The container assembly may include a mixer conduit defining a proximal end and a distal end oppositely disposed to the proximal end, and the proximal end of the mixer conduit may be in fluid communication with the mixer chamber. The beverage creation method may include the next step of filling the liquor into the liquor chamber through the liquor fill hole. The beverage creation method may include the next step of filling the mixer into the mixer chamber through the mixer fill hole. beverage creation method may include the next step of providing a head assembly. The head assembly may include a turbulator configured to combine the liquor and the mixer, and the turbulator may further include a liquor inlet, a mixer inlet, and a mixed drink outlet. The head assembly may include a liquor pump in fluid communication with the proximal end of the liquor conduit and the liquor inlet of the turbulator, and a mixer pump in fluid communication with the proximal end of the mixer conduit and the mixer inlet of the turbulator. The head assembly may further include a nozzle, which may be in fluid communication with the mixed drink outlet. The head assembly may further include an electronics circuit board in electrical communication with the liquor pump and the mixer pump. The electronics circuit board may include a mix adjuster configured to adjust the ratio of the liquor and the mixer. The head assembly may include a battery configured to power the electronics circuit board, the liquor pump, and the mixer pump. The head assembly may further include a trigger configured to activate the liquor pump and the mixer pump. The beverage creation method may include the next step of attaching, after filling the liquor and the mixer, the head assembly to the container assembly. The beverage creation method may include the next step of adjusting, using the mix adjuster, the ratio of the liquor, and the mixer. The beverage creation method may include the next step of operating, controllingly, in response to the ratio of the liquor and the mixer, the liquor pump, and the mixer pump for drawing the liquor and the mixer from the liquor chamber and the mixer chamber, respectively. The beverage creation method may include the next step of combining, the liquor and the mixer in the turbulator, for creating the mixed drink of the liquor and the mixer. The beverage creation method may include the next step of dispensing the mixed drink from the nozzle.

In one configuration, a sealing method for a beverage container assembly for components of a mixed beverage is disclosed. The sealing method may include the first step of inserting a liquor chamber in a finish formed at an entrance of a mixer chamber. The mixer chamber may be configured to store a mixer, and the mixer chamber may further include a finish formed at an entrance of the mixer chamber and coaxial to a centerline. The finish may further include a sealing surface formed at the entrance of the mixer chamber, an external thread formed on an outside surface thereof, and a bore formed at the entrance and coaxial to the centerline. The beverage dispenser container may include a liquor chamber configured to store the liquor. The liquor chamber may further include a separator plate. Further, a liquor opening may be formed in the separator plate. The sealing method may include the next step of adjoining the separator plate of the liquor chamber and either the bore or the sealing surface of the mixer chamber using a seal. The sealing method may include engaging a head assembly to the beverage container assembly. The head assembly may include an internal thread engagingly coupled to the external thread of the mixer chamber, and an adjoining the seal, The sealing method may include the next step of sealing the liquor chamber from the mixer chamber using the seal.

In one configuration, an adjustment method for adjusting a flow rate of a mixed drink of liquor and a mixer is disclosed. The adjustment method may include the first step of providing a container assembly. The container assembly may include a mixer chamber configured to store the mixer. The mixer chamber may include an opening, a liquor chamber removably positioned in the mixer chamber, and the liquor chamber configured to store the liquor. The beverage dispenser may include a separator plate adjacent to the opening, and the separator plate may further include a liquor fill hole in fluid communication with the liquor chamber. The container assembly may further include a liquor conduit defining a proximal end, and a distal end oppositely disposed to the proximal end. The proximal end of the liquor conduit may be in fluid communication with the liquor chamber. The separator plate may further include a mixer fill hole which may be in fluid communication with the mixer chamber. The container assembly may include a mixer conduit defining a proximal end and a distal end oppositely disposed to the proximal end, and the proximal end of the mixer conduit may be in fluid communication with the mixer chamber. The adjustment method may include the next step of filling the liquor into the liquor chamber through the liquor fill hole. The adjustment method may include the next step of filling the mixer into the mixer chamber through the mixer fill hole. adjustment method may include the next step of providing a head assembly. The head assembly may include a turbulator configured to combine the liquor and the mixer, and the turbulator may further include a liquor inlet, a mixer inlet, and a mixed drink outlet. The head assembly may include a liquor pump in fluid communication with the proximal end of liquor conduit and the liquor inlet of the turbulator, and a mixer pump in fluid communication with the proximal end of the mixer conduit and the mixer inlet of the turbulator. The head assembly may further include a nozzle, which may be in fluid communication with the mixed drink outlet. The head assembly may further include an electronics circuit board in electrical communication with the liquor pump and the mixer pump. The electronics circuit board may include a mix adjuster configured to adjust a ratio of the liquor and the mixer. The head assembly may include a battery configured to power the electronics circuit board, the liquor pump and the mixer pump. The head assembly may further include a trigger configured to activate the liquor pump and the mixer pump.

The head assembly may further include a rate adjuster connected to the electronics circuit. The adjustment method may include the next step of attaching, after filling the liquor and the mixer, the head assembly to the container assembly. The adjustment method may include the next step of adjusting, using the mix adjuster, the ratio of the liquor and the mixer. The adjustment method may include the next step of operating, controllingly, in response to the ratio of the liquor and the mixer, the liquor pump and the mixer pump for drawing the liquor and the mixer from the liquor chamber and the mixer chamber, respectively. The adjustment method may include the next step of combining, the liquor and the mixer in the turbulator, for creating the mixed drink of the liquor and the mixer. The adjustment method may include the next step of dispensing the mixed drink from the nozzle. Further, the adjustment method may include the next step of engaging the rate adjuster to increase the flow rate of the mixed drink from the nozzle

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include:

FIG. 13 illustrates a perspective view of a threaded collar;

FIG. 14 illustrates a side view of the threaded collar;

FIG. 15 illustrates a top view of the threaded collar;

FIG. 16 illustrates a sectional view of the threaded collar of FIG. 15 taken across plane 16-16;

FIG. 22 illustrates a sectional view of the head assembly frame of FIG. 19 taken across plane 22-22;

FIG. 23 illustrates a right-side exploded view of the head assembly frame;

FIG. 24 illustrates a left-side exploded view of the head assembly frame;

Figure 1:
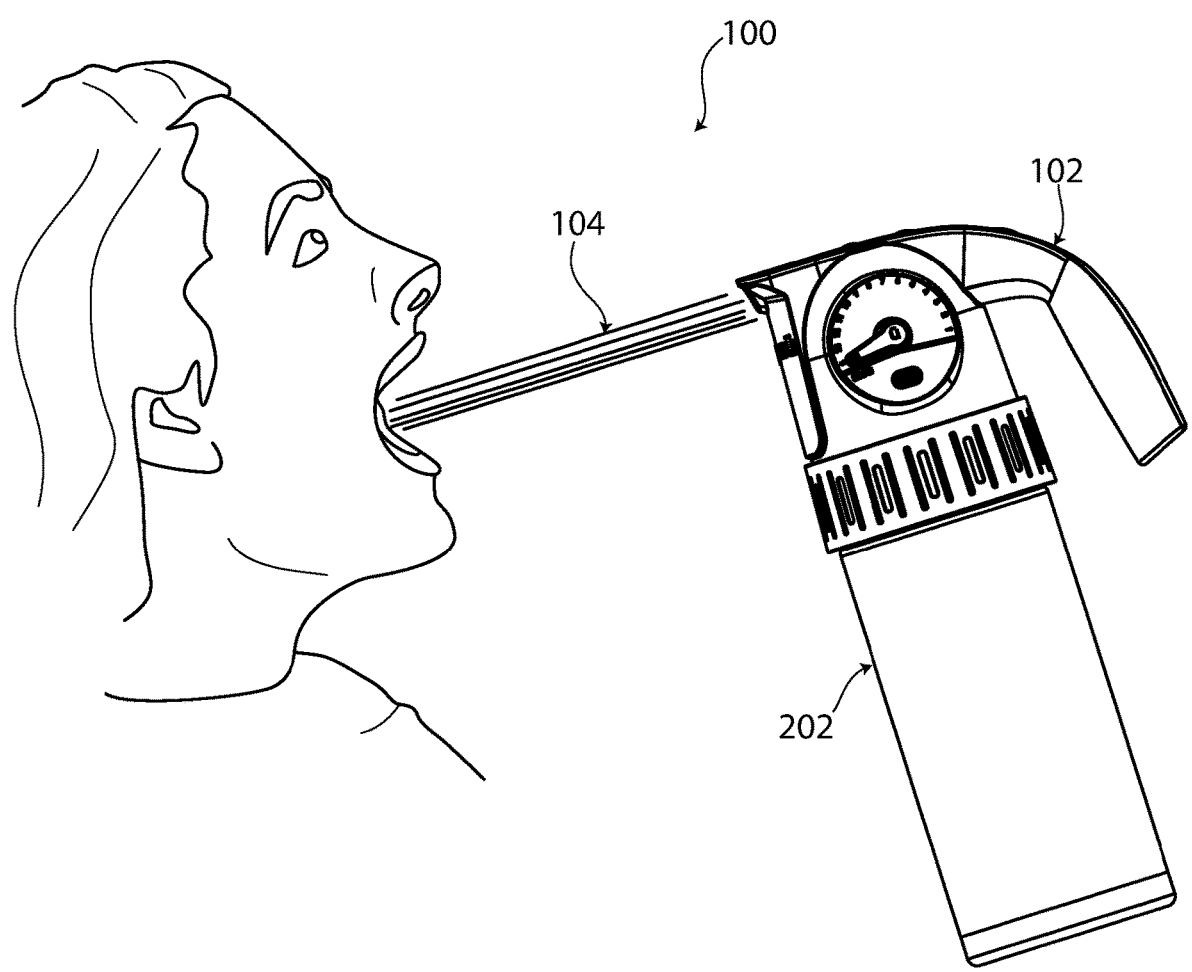
FIG. 1 is a view of one illustrative configuration of a beverage dispenser during dispensing of a drink into a mouth of a user.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

It should be noted that while the following description is configured for a beverage dispenser and methods of dispensing the beverage, the beverage dispenser may be filled with various types of liquor and suitable mixers for the liquor selected. The beverage dispenser may be utilized to create and dispense a drink which may include a mixture of the liquor and the mixer. Additionally, various components have been identified with reference to 'liquor' and 'mixer' before reference labels, these terms may be reversed and/or substituted with other liquid materials (e.g., carbonated liquid, juice, sweet water, etc.).

Mixed drinks (e.g., liquor-bearing 'cocktails' or non-alcoholic 'mocktails') are created by manual devices such as a shaker. The shaker is a two-part assembly into which liquor and mixer are poured (along with ice, sugar, spirits, carbonated liquid, juice, etc.). As the name suggests, after filling, the two-part assembly may be sealed to form a single cavity and shaken vigorously for a period (e.g., 15 to 20 seconds). After shaking, the contents of the shaker are poured into a glass, and thus a beverage is created. This process is laborious since creating a perfect cocktail requires manual measurement of the liquids, mixing, and dispensing.

As an alternative, a dispensing system described herein stores, mixes, and dispenses drinks. A removable lid assembly contains equipment to pump, mix, and dispense drinks. This pumping, mixing, and dispensing provides a device that is portable, reliable, time-efficient, effective, and easy-to-use to minimize necessity of mixology skill(s). Regardless of mixology skill(s), a user can easily create, store, transport, consume, serve, and share many types of mixed drinks in any environment.

In one configuration, the beverage dispenser may include a container assembly and a head assembly. The container assembly may be configured to store liquor and a mixer. The head assembly may be, removably, attached to the container assembly. The head assembly may include at least one pump configured to draw the liquor and the mixer from the container assembly in a fixed and/or variable ratio and to transmit the liquor and the mixer to a mixing unit. The ratio of the liquor and the mixer may be set by an adjuster, which is described later herein. Further, the liquor and the mixer may be mixed in the mixing unit to create a drink (interchangeably referred to as beverage, drink, cocktail drink, mocktail, mixed drink, or the like). The drink is further transmitted from the mixing unit and dispensed from the head assembly using a nozzle. Liquor may include an alcoholic drink such as vodka, gin, whiskey, etc. The mixers may include a mixer suitable for the liquor, i.e., flavored fluids which may easily be combined with the liquor. Examples of mixers may include instant pre-mixes for cocktail drinks such as pre-mixes for margarita, which may be easily combined with tequila, vodka, gin, etc. Other examples of mixers may also include sour mixes or syrups such as agave syrup, sugar syrups, triple sec/Cointreau, and the like. The beverage dispenser may, for example, be electrically powered using a battery (e.g., a rechargeable lithium-ion battery). The head assembly may also include a power switch to control power to at least one pump. The head assembly may also include a trigger that, when actuated, may be configured to cause the drink to dispense from the head assembly.

With reference to FIG. 1 illustrating a side-elevation view 100 of a beverage dispenser 102 dispensing a drink 104, the beverage dispenser 102 may be configured to store liquor and mixer. By mixing the liquor and the mixer, the beverage dispenser 102 creates the drink 104 dispensed in a laminar flow (or a near-laminar flow).

Figure 2:
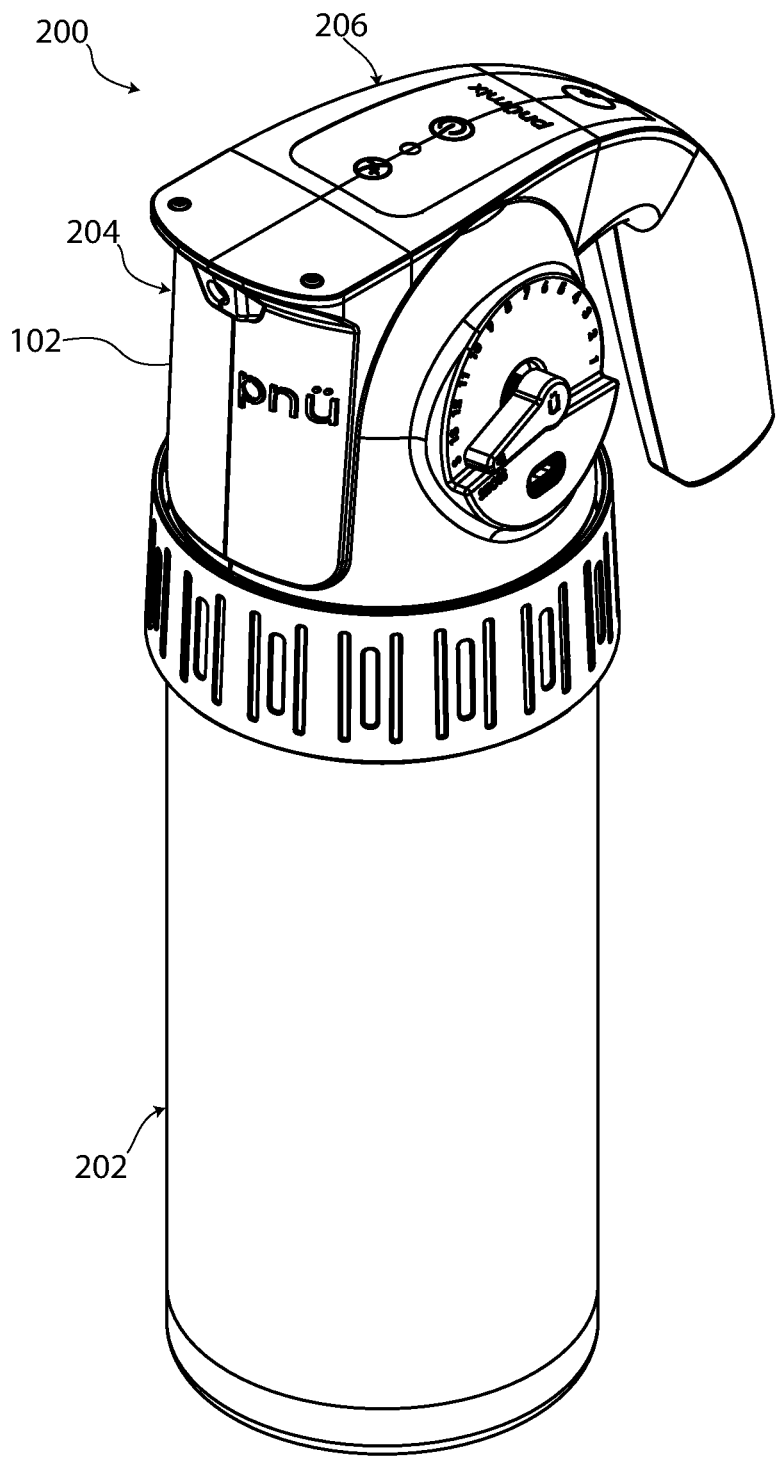
FIG. 2 is a perspective view of the beverage dispenser of FIG. 1.

Referring now to FIG. 2 illustrating a perspective view 200 of the beverage dispenser 102, the beverage dispenser 102 may be provided with a container assembly 202 and a head assembly 204. The container assembly 202 may be configured as a single-wall or double-wall insulated bottle which may be made of metal (e.g., stainless steel, aluminum, brass, etc.), plastic (e.g. polyethylene terephthalate, high-density polyethylene, etc.), or other structural material (e.g. glass). The head assembly 204 may include a housing 206. The housing 206 may be made of metal or plastic and configured to enclose items such as, for example, an electronic circuit, a pump(s), a mixing unit, a battery, and a nozzle. The head assembly 204 may be engaged to the container assembly 202 by a helical thread 320 (FIG. 3) or other removable mechanism for sealingly engaging the head assembly 204 to the container assembly 202.

Figure 3:
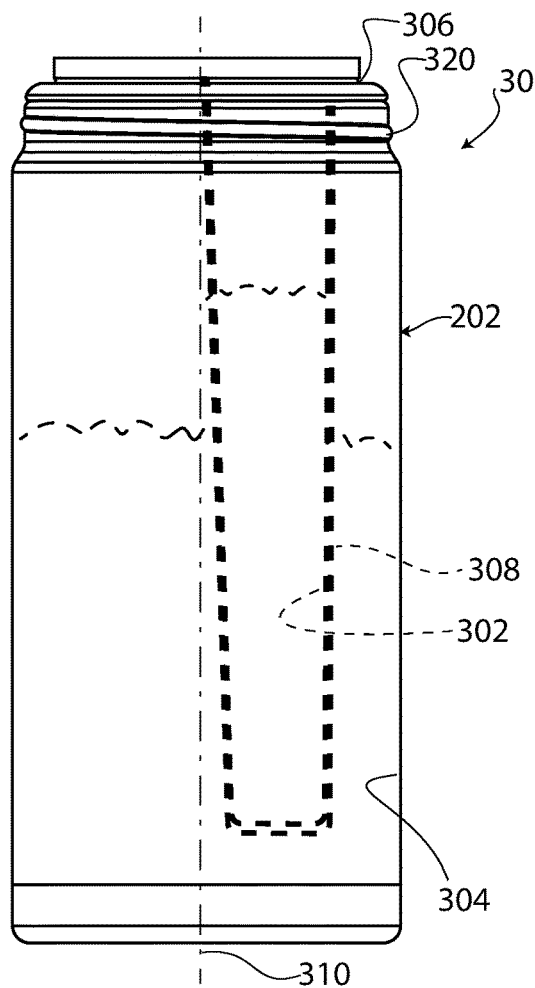
FIG. 3 is a front view of a container assembly of FIG. 1.

With reference to FIG. 3 illustrating a front view 300 of the container assembly 202 provided with a liquor chamber 302 and a mixer chamber 304. The liquor chamber 302 is configured to store liquor while the mixer chamber 304 is configured to store the mixer. In one configuration, the mixer chamber 304 may include a bore 306 near an opening of the container assembly 202. Further, the liquor chamber 302 may include a semi-circular surface 308 (also shown in FIGS. 4 and 6) coaxial to a centerline 310 of the container assembly 202, and a liquor chamber diameter DL (FIG. 4) may be less than a mixer chamber diameter DM (FIG. 4) of the bore 306. The dimensions of the liquor chamber diameter DL and the mixer chamber diameter DM allow the liquor chamber 302 to pass through the bore 306 and be inserted into the mixer chamber 304. As illustrated in the front view 300, a volume of the liquor chamber 302 may be less than that of the mixer chamber 304. Additionally, the mixer chamber 304 of the container assembly 202 may be provided with an engagement mechanism such as a helical thread 320.

Figure 4:
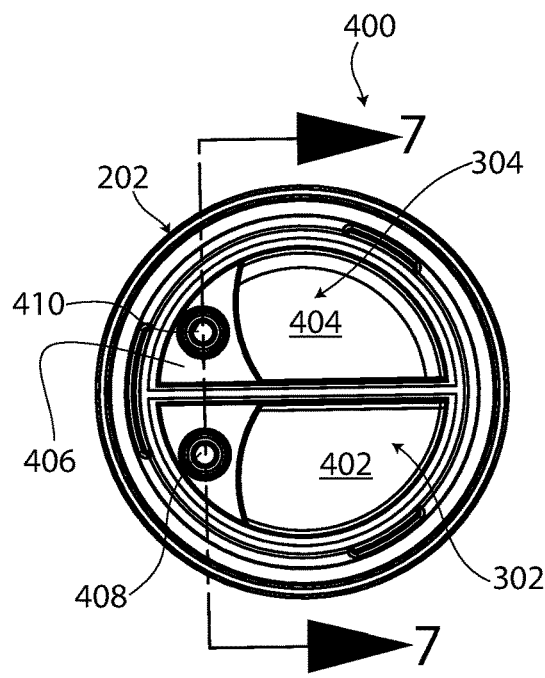
FIG. 4 is a top view of the container assembly of FIG. 3.

FIG. 4 illustrates a top view 400 of the container assembly 202 provided with a liquor fill hole 402, a mixer fill hole 404, and a separator plate 406. The liquor fill hole 402 and the mixer fill hole 404 may be formed in the separator plate 406. The liquor chamber 302 is in fluid communication with liquor fill hole 402. The mixer chamber 304 is in fluid communication with mixer fill hole 404. As illustrated, the container assembly 202 may include a liquor port 408 and a mixer port 410. The liquor port 408 and the mixer port 410 may be formed in the separator plate 406. The liquor fill hole 402 may be adjacent to the liquor port 408. The mixer fill hole 404 may be adjacent to the mixer port 410.

Figure 5:
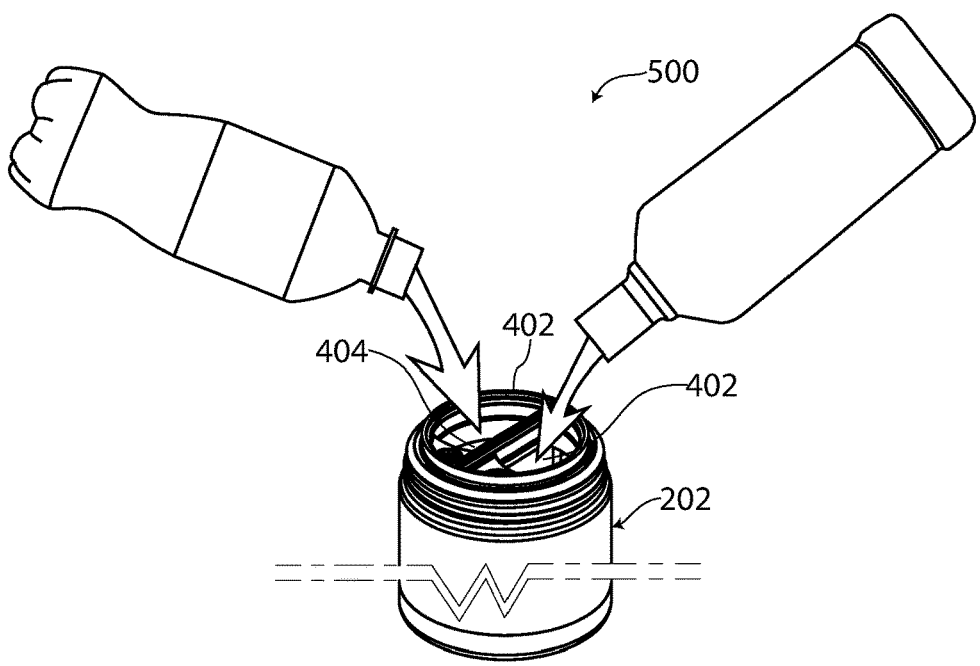
FIG. 5 is an illustrative method of filling the container assembly.

FIG. 5 illustrates a filling method 500 for filling the container assembly 202. To fill the liquor chamber 302, the user may pour liquor into the liquor chamber 302 through the liquor fill hole 402. To fill the mixer chamber 304, the user may pour mixer into the mixer chamber 304 through the mixer fill hole 404. It is noted that partial filling of the liquor of the mixer may occur depending on the number of drinks to be created and/or mix ratio of the liquor-to-mixer.

Figure 6:
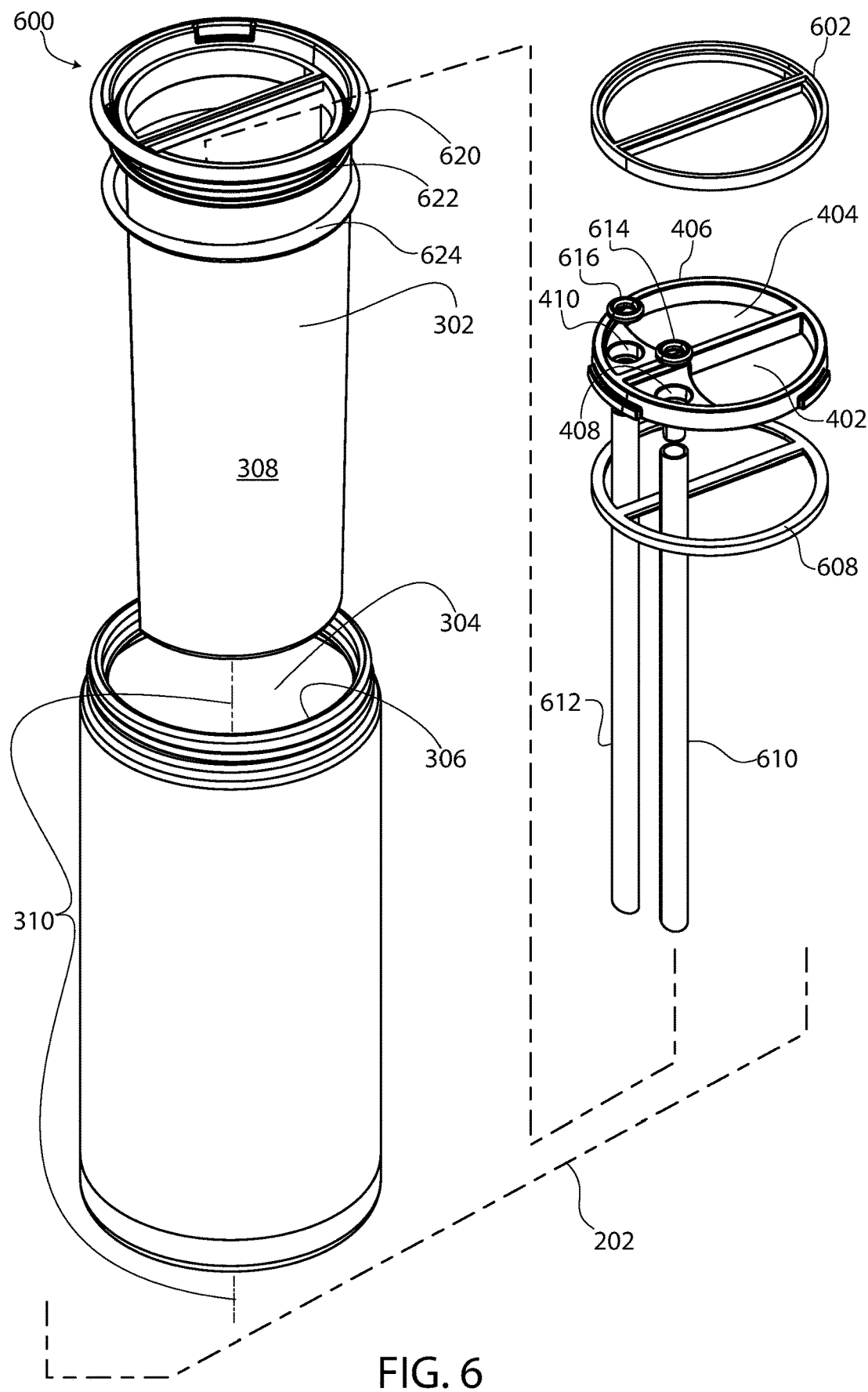
FIG. 6 is an illustrative exploded view of the container assembly of FIG. 1.

FIG. 6 is an exploded view 600 of an illustrative configuration of the container assembly 202 wherein the liquor chamber 302 is inserted into the mixer chamber 304. The container assembly 202 may be provided with a liquor conduit 610 and a mixer conduit 612. The liquor conduit 610 may be fluidically connected to the liquor fill hole 402. The mixer conduit 604 may be fluidically coupled to the mixer port 410. As illustrated, the liquor conduit 610 may include a proximal end and a distal end. The distal end of the liquor conduit 610 may be deeply inserted into the liquor chamber 302, and the proximal end may be connected to liquor port 408. The mixer conduit 612 may include a proximal end and a distal end. The proximal end of the mixer conduit 604 may be inserted in the mixer port 410, and the distal end of the mixer conduit 604 may be deep inside the mixer chamber 304.

With continued reference to FIG. 6, the container assembly 202 may be further provided with a top seal 602 and a bottom seal 608. The top seal 602 may adjoin a top surface of the separator plate 406. The bottom seal 608 may adjoin a bottom surface of the separator plate 406. As illustrated, the separator plate 406 may be sandwiched between the top seal 602 and the bottom seal 608. In one configuration, the separator plate 406 is removably adjoined to the liquor chamber 302. The separator plate 406, the top seal 602, and the bottom seal 608 may be configured to compartmentalize the mixer chamber 304 from the liquor chamber 302 (i.e., the mixer and the liquor are not in fluid communication with each other while stored in the container assembly 202).

Still referring to FIG. 6, the container assembly 202 may further include a bezel 620 formed at the top of the liquor chamber 302. The bezel 620 may include an O-ring groove 622 formed to receive an O-ring 624. The O-ring 624 seals the bezel 620 to the mixer chamber 304 as illustrated. If configured as illustrated, the separator plate 406 is received by the bezel 620 such that the liquor fill hole 402 is aligned with the mixer chamber 304, and the liquor fill hole 402 is aligned with the liquor chamber 302. The bezel 620 be formed with detents as illustrated for aligning the separator plate 406. In this configuration, the semi-circular surface 308 of the mixer chamber 304 is co-axial to the centerline 310 of the container assembly 202.

In one illustrative configuration, the dimensions of the separator plate 406 may be less than or equal to the dimensions of the opening or entrance of the of the mixer chamber 304 such that the separator plate 406 may be positioned on the finish of the mixer chamber 304. The separator plate 406 may include a clocking partition 606, such as a bridge, which may be configured to separate the opening of the container assembly 202 into liquor fill hole 402 and mixer fill hole 404 (and all related components in fluid communication therewith). In the same configuration, the liquor port 408 and the mixer port 410 may be provisioned on the separator plate 406. The liquor port 408 and the mixer port 410 may be configured with a liquor port seal 614 and a mixer port seal 616, respectively. The liquor port seal 614 may be configured as an O-ring, and the mixer port seal 616 may be configured as an O-ring. In another configuration, the liquor port 408 and the mixer port 410 may be connected to inlets of a mixing unit which is described in detail in conjunction with successive configurations.

In another illustrative configuration, with continued reference to FIG. 6, the top seal 602 and the bottom seal 608 may be formed to include a torrid, a planer profile, or a flange seal. It should be noted that the top seal 602 and the bottom seal 608 may be manufactured in accordance with the dimensions and structure of the separator plate 406. By way of an example, the top seal 602 and the bottom seal 608 may also include a circular profile with a bridge dividing the circular profile into (approximately) halves for separating the liquor fill hole 402 and the mixer fill hole 404. In another configuration, the top seal 602 may include a groove formed into the face. By way of an example, the upper surface of the top seal 602 may be partially indented to tightly/sealingly receive the head assembly 204. In another configuration, the separator plate 406 may be ultrasonically welded to the liquor chamber 302 (specifically a bezel 630 described in FIG. 6) either with a top seal 602 positioned therebetween or without the top seal 602. On the separator plate 406, the bottom seal 608 may be positioned.

Figure 7:
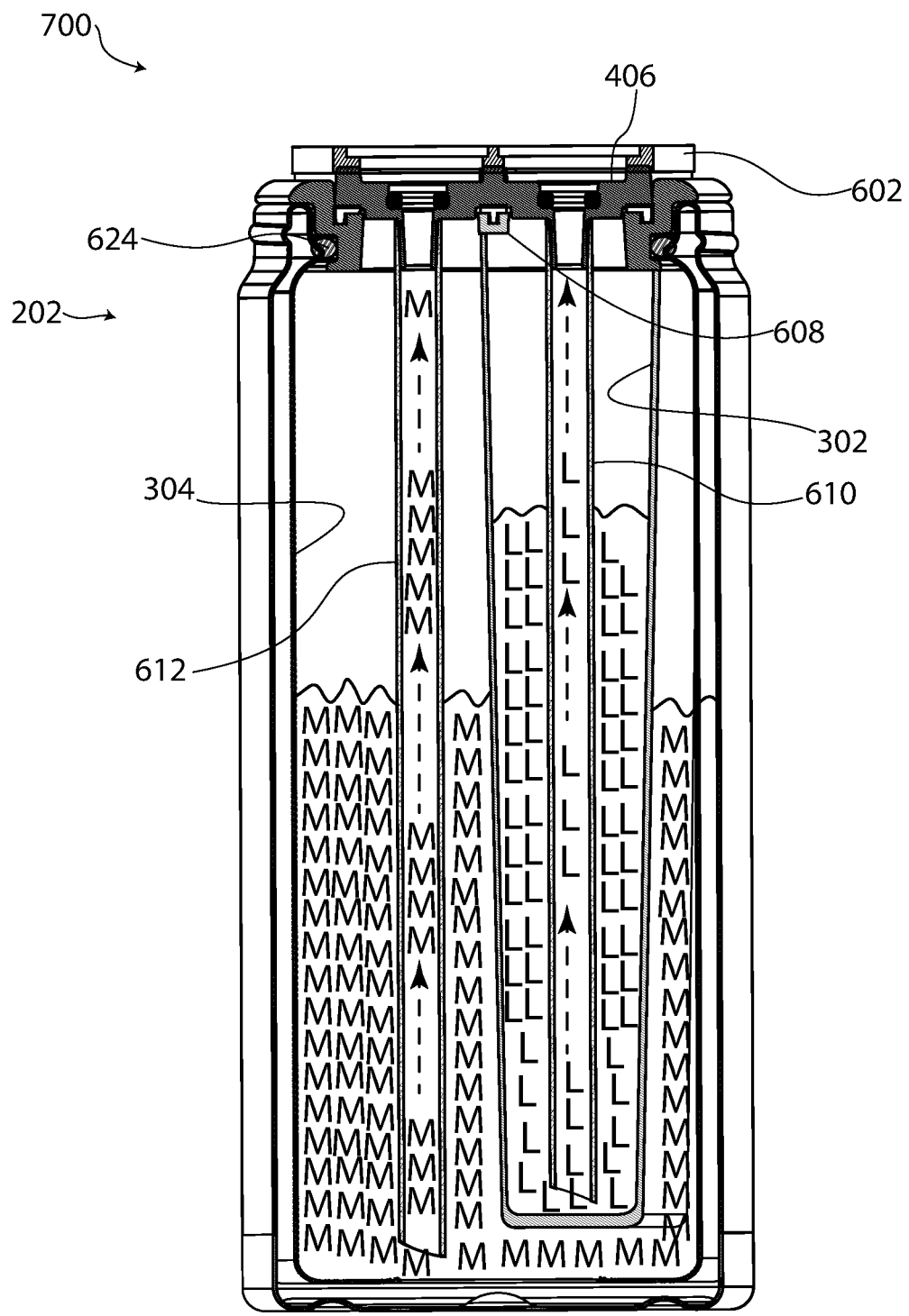
FIG. 7 is a sectional view of the container assembly of FIG. 4 taken across plane 7-7 in a partially filled condition.

With reference to FIG. 7 illustrating a cross-sectional view 700 of the container assembly 202 taken across plane 7-7 (of FIG. 4), the container assembly 202 may be, partially, filled with liquor (noted by 'L') and mixer (noted by 'M') though the liquor fill hole 402 and the mixer fill hole 404. As configured with the liquor chamber 302 inserted in mixer chamber 304 and the separator plate 406 positioned as illustrated, the mixer conduit 612 is positioned in mixer chamber 304. Likewise, the liquor conduit 610 is positioned in the liquor chamber 302.

Figure 8:
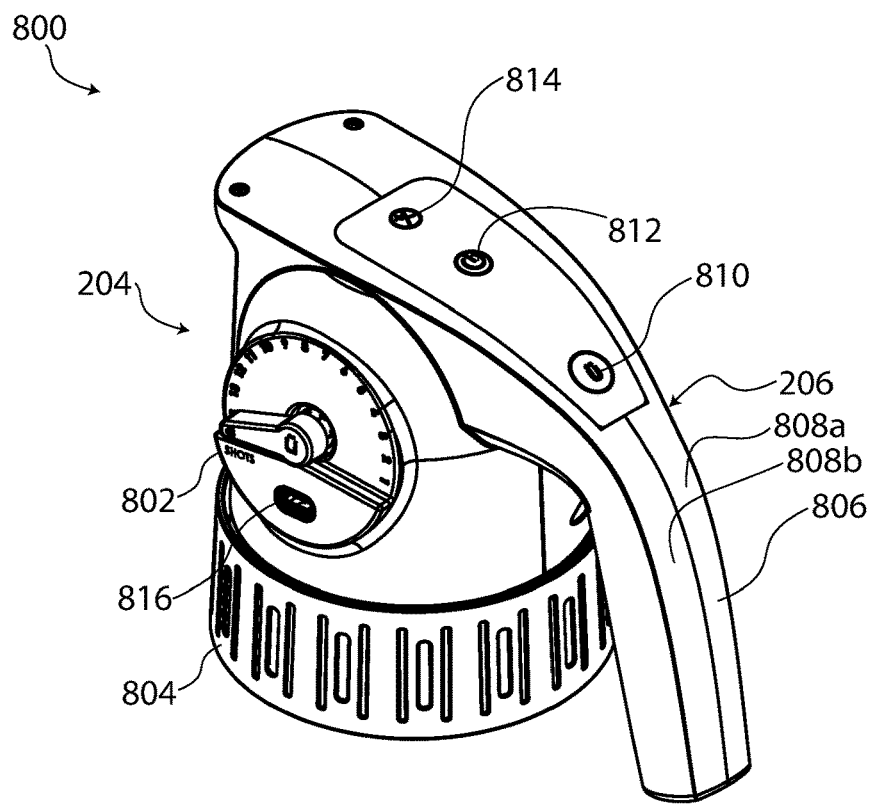
FIG. 8 is a rear perspective view of an illustrative configuration of a head assembly.

FIG. 8 illustrates a rear perspective view 800 of the head assembly 204 that may be provided with a mix adjuster 802, a threaded collar 804, a handle 806, a dispense trigger 810, a power switch 812, a rate adjuster 814, and a charging port 816. In the same configuration, the head assembly 204 may also include the housing 206. The housing 206 may be formed by joining a first half 808a and a second half 808b, and it may be configured to accommodate the components of the head assembly 204. The first half 808a and the second half 808b may be clipped together, interlocked with each other using any snap fastening, or other fastening methods commonly known in the art (e.g., threaded hi-low screws for plastic). The head assembly 204 may be attached to the container assembly 202 such that the head assembly casing may act as a cap to the container assembly 202. The bottom seal 608 may seal the head assembly 204 and the container assembly 202.

With continued reference to FIG. 8, the mix adjuster 802 may be configured to set a ratio of the liquor and the mixer to increase or decrease the liquor concentration in the drink. The mix adjuster 802 may be further configured to set the ratio in accordance with a mix value ranging from 1 to 13+'S' (14 total settings) with 1 being the ratio at which the drink may include the lowest concentration of the liquor and 'S' being the ratio at which the drink may include the highest permissible concentration of the liquor (i.e., 100% liquor). The lowest mix value 1 may correspond to a ratio of liquor to mixer of 1:4.5, i.e., 1 part of liquor to 4.5 parts mixer (18.1%), and the highest numerical mix value of 13 may correspond to the ratio of liquor to mixer being 4.5:1, i.e., 4.5 parts liquor to 1 part mixer (81.8%). In one configuration, the mid-point of the scale (e.g., 7) may correspond to a ratio of liquor to mixer being 1:1, i.e., 1 part liquor to 1 part mixer (50%). The mix value may be selected by the user using a lever switch, knob, or any other multiple switching devices known in the art. The assembly of the mix adjuster may be explained in detail in conjunction with FIGS. 17-18. Below is one illustrative configuration of dial settings:

| Dial Setting | Ratio Liquor to Mixer | Alcohol Ratio |
|---|---|---|
| 1 | 1 to 4.5 | 0.181 |
| 2 | 1 to 3.5 | 0.222 |
| 3 | 1 to 2.5 | 0.286 |
| 4 | 1 to 2 | 0.333 |
| 5 | 1 to 1.5 | 0.400 |
| 6 | 1 to 1.25 | 0.444 |
| 7 | 1 to 1 | 0.500 |
| 8 | 1.25 to 1 | 0.556 |
| 9 | 1.5 to 1 | 0.600 |
| 10 | 2 to 1 | 0.667 |
| 11 | 2.5 to 1 | 0.714 |
| 12 | 3.5 to 1 | 0.778 |
| 13 | 4.5 to 1 | 0.818 |
| S | 1 to 0 | 1 |

As illustrated in FIG. 8, the head assembly 204 may include the handle 806 may include a protrusion to which a grip may be adjoined. In the same configuration, the head assembly 204 may also include at least one electric battery, which may be accommodated in the handle 806 or generally supported inside the housing 206. The power switch 812 may be electrically connected to the at least one electric battery directly or via circuitry and configured such that actuating the power switch 812 may power the beverage dispenser ON/OFF accordingly. The at least one battery may be further connected to the charging port 816 directly or via circuitry (e.g., a charge control application-specific circuit). The charging port 816 may include a USB-type charging port commonly available in the state of the art such as a USB-C port. The charging port 816 may be connected to an external power plug via a USB cable and the like. In the same configuration, the dispense trigger 810 may be configured to activate when actuated the dispensing of the mixed drink at a predefined flow rate from the head assembly 204. In the same configuration, to increase the flow rate, the rate adjuster 814 may be actuated. The electric connection of the dispense trigger 810, the power switch 812, and the rate adjuster 814 may be illustrated in detail in conjunction with FIGS. 17-18.

Figure 9:
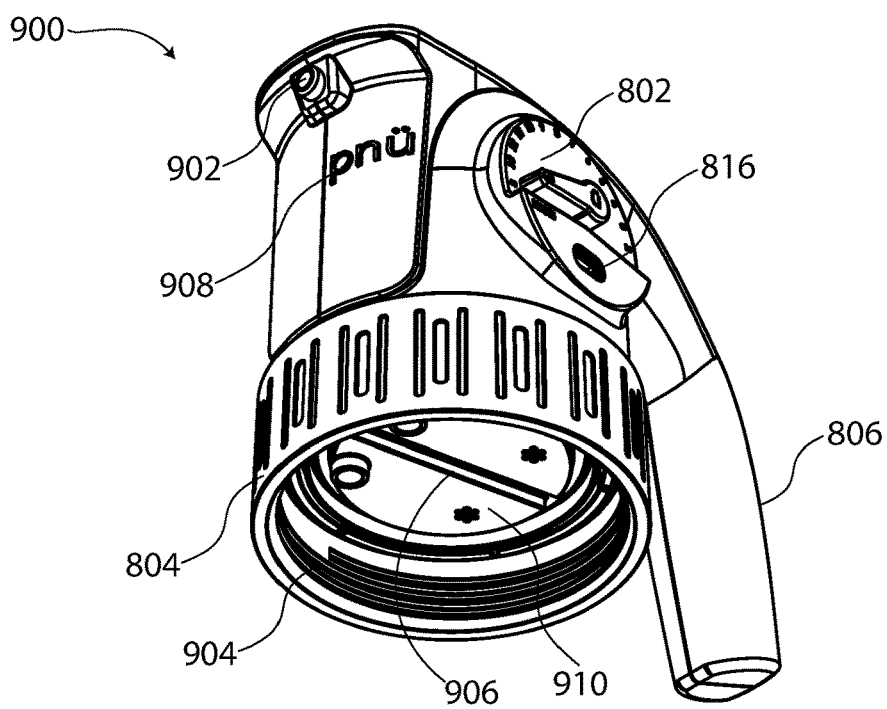
FIG. 9 is a bottom perspective view of the head assembly of FIG. 8.

With reference to FIG. 9 illustrating a bottom perspective view 900 of the head assembly 204, the head assembly 204 may include a nozzle 902, an internal screw threads 904, a clocking groove 906, an illuminator 908, and base plate 910. The nozzle 902 may be fluidically connected to the mixing unit and may be configured to discharge the mixed drink from the head assembly 204. The internal screw threads 904 is further illustrated, for example, in FIGS. 13-16. The clocking groove 906 is configured to interface with clocking partition 606 (FIG. 6) to align the head assembly 204 with the container assembly 202. The illuminator 908 is further described in FIGS. 33 and 34. The base plate 910 may formed with the clocking groove 906. The clocking groove 906 may be configured to align the head assembly 204 to the container assembly 202 by engaging with the clocking partition 606 (refer to FIG. 6).

With continued reference to FIG. 9, in one illustrative configuration, the head assembly 204 may include an illuminated branding of the beverage dispenser. The branding may be configured as 'PNU', which is a symbolic applicant's word mark of PNUMIX. The branding may be illuminated using a panel of RGB-LEDs. In another configuration, the branding may be illuminated when the power switch 812 is triggered. The illuminated branding may provide an operational status of the beverage dispenser 102, i.e., the beverage dispenser 102 is turned ON or the creation of the drink is in process. The illuminated branding may indicate that batter, mixer, and/or liquor are depleted. In the same configuration, the illuminated branding may be covered by a protective layer 912. The protective layer 912 may include a thin transparent sheet attached to the housing 206.

Figure 10:
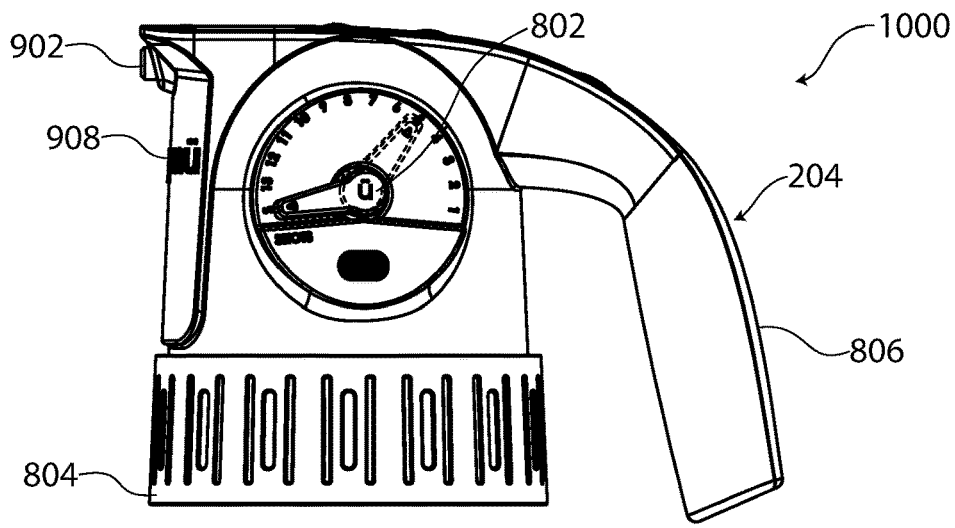
FIG. 10 illustrates a right-side view of the head assembly.

With reference to FIG. 10 illustrating a side view 1000 of the head assembly 204, the mix adjuster 802 is selectable adjustable such as the illustrated positions indicated by both solid and dashed lines.

Figure 11:
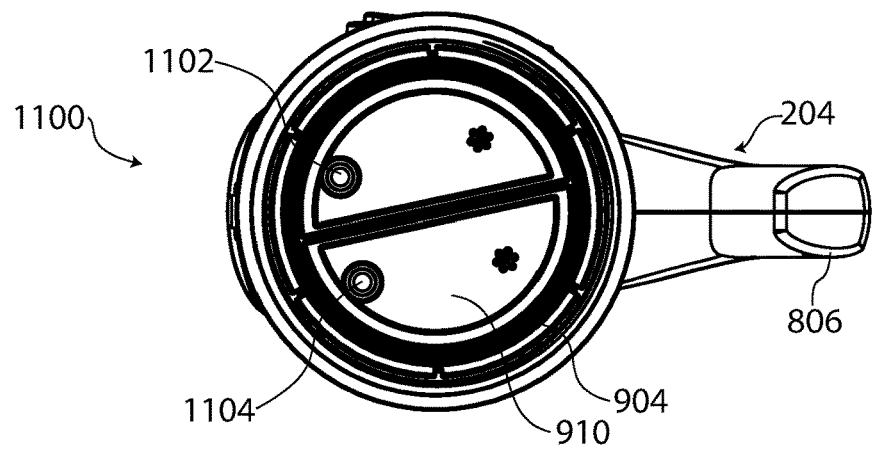
FIG. 11 illustrates a bottom view of the head assembly.

Referring to FIG. 11 of a bottom view 1100 of the head assembly 204, the head assembly 204 may further include a liquor protrusion 1102, and a mixer protrusion 1104. The liquor protrusion 1102 and the mixer protrusion 1104 pay be formed in the base plate 910 and may be configured to interface with the liquor port 408 (FIG. 6) and the mixer port 410 (FIG. 6) respectively, when the container assembly 202 is connected to the head assembly 204. In the same configuration, the liquor protrusion 1102 and the mixer protrusion 1104 may be connected to the at least one pump. The at least one pump may be operated to draw the liquor and the mixer from the container assembly 202 through the liquor protrusion 1102, the mixer protrusion 1104, the liquor conduit 610, and the mixer conduit 612, respectively, and to transmit the drawn liquor and mixer to the mixing unit.

Figure 12:
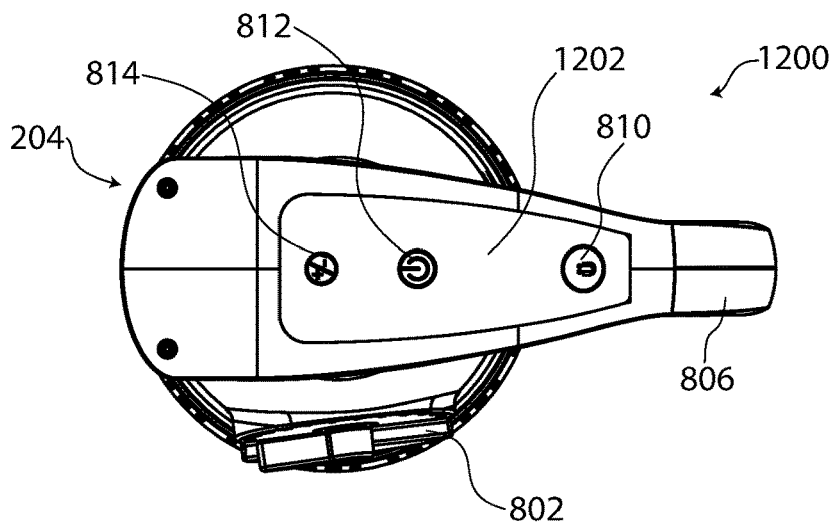
FIG. 12 illustrates a top view of the head assembly.

Referring to FIG. 12 of a top view 1200 of the head assembly 204, the head assembly 204 may further include an indica cover 1202 provided with indica of the dispense trigger 810, the power switch 812, and the rate adjuster 814. The indica cover 1202 may include an adhesive surface for bridging across the first half 808a and the second half 808b. Features such as cantilevered tabs (not shown) may be positioned underneath the dispense trigger 810, the power switch 812, and the rate adjuster 814. The cantilevered tabs deflect in response to force exerted by the user, the deflected cantilevered tabs interact with switches located inside the head assembly 204. In one configuration, the indicia cover 1202 may also include an indicator (e.g. an LED) that changes color to indicate dial setting or other status of the beverage dispenser 102.

In FIG. 13, an illustrates a perspective view 1300 of a configuration of the threaded collar 804 may be provided with the internal screw threads 904 to engage the external threads configured as, for example, helical thread 320 (FIG. 3) on the mixer chamber 304 (FIG. 3). The threaded collar 804 may include an internal surface and an external surface. The internal surface may be configured to accommodate the internal screw threads 904, and the external surface may define a grip 1302. The user may hold the grip 1302 and to rotate the threaded collar 804 in a clockwise or counterclockwise direction. Rotation of the threaded collar 804 in clockwise direction may advance the threaded collar 804 vertically downward to affix the container assembly 202 to the head assembly 204. To separate the container assembly 202 and the head assembly 204, the threaded collar 804 may be rotated in counterclockwise direction, which may further advance the threaded collar 804 vertically upward, thereby releasing the container assembly 202 from the head assembly 204. FIG. 14 illustrates a side view 1400 of the threaded collar 804 formed with a conical shape.

With reference to FIG. 15 showing a bottom view of the threaded collar 804, the threaded collar 804 may have a circular profile with an internal ring 1502 formed along the internal surface. The internal ring 1502 may be provided for capturing the threaded collar 804 to the housing 206 of the head assembly 204.

With reference to FIG. 16 showing a cross-sectional view of the threaded collar 804 taken across plane 16-16 (FIG. 15), the internal screw threads 904 may be formed on one end of the threaded collar 804 with the internal ring 1502 centrally located.

Figure 17:
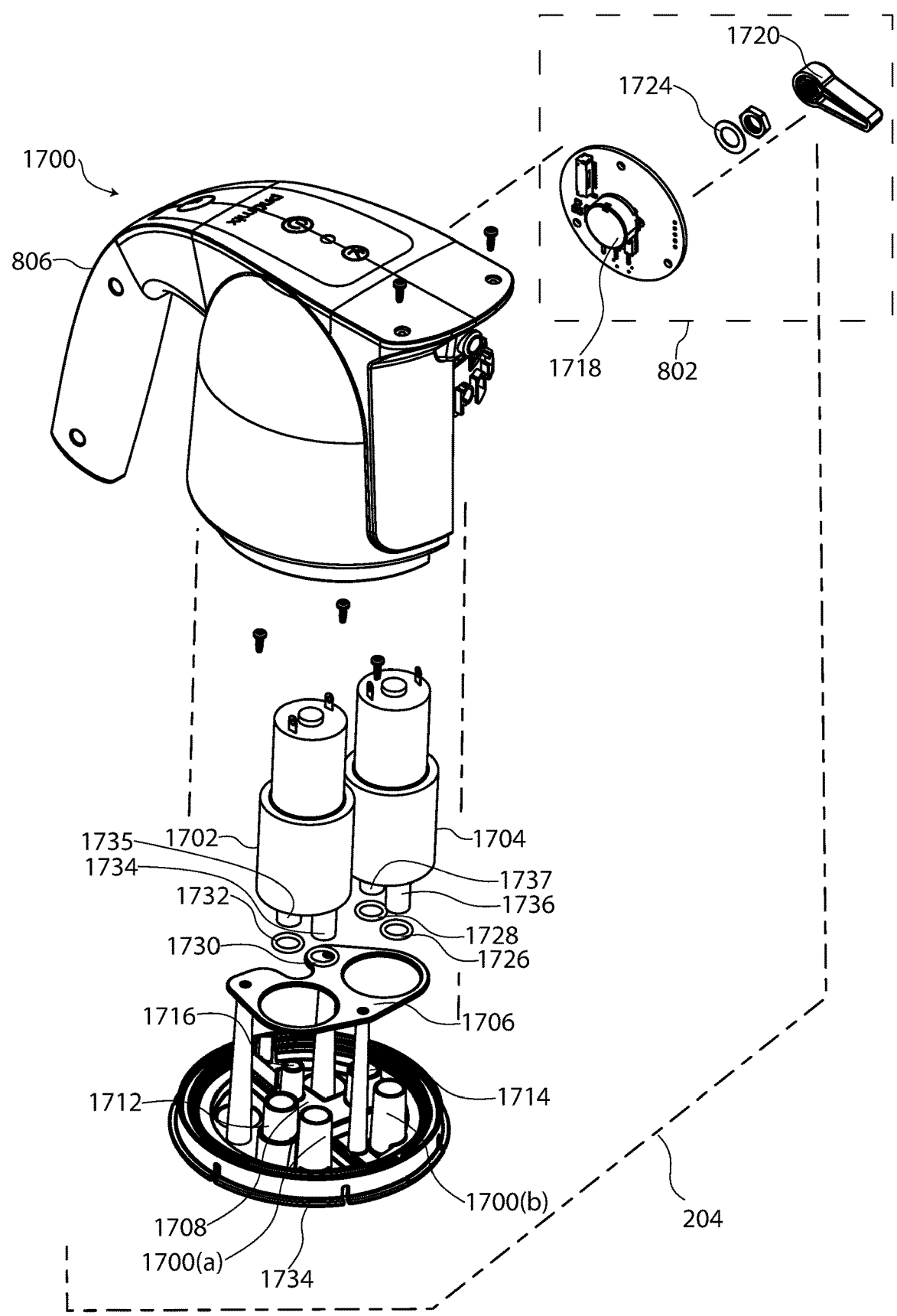
FIG. 17 illustrates a right-side exploded view of the head assembly of FIG. 10.

FIG. 17 illustrates a left-side exploded view 1700 of the head assembly 204 wherein the head assembly 204 may include at least one pump. Or, as illustrated two pumps such as a liquor pump 1702 and a mixer pump 1704. The liquor pump 1702 may include a liquor pump inlet 1734 and a liquor pump outlet 1735. Similarly, the mixer pump 1704 may include a mixer pump inlet 1736 and a mixer pump outlet 1737. In another configuration, the liquor pump inlet 1734 may be connected to liquor protrusion 1102 (FIG. 11), and the mixer pump inlet 1736 may be connected to the mixer protrusion 1104 (FIG. 11). The liquor pump 1702 and the mixer pump 1704 may be held in a pump flange 1706. The pump flange 1706 may include two circular grooves formed adjacent to each other. In this configuration, the pump flange 1706 may be configured to hold the liquor pump 1702 and the mixer pump 1704 within the circular grooves. In the same configuration, the pump flange 1706 may be supported using three pillar supports 1808(a), 1808(b), and 1808(c). Each pillar support from among the three pillar supports 1808(a), 1808(b), and 1808(c) may include a proximal end and a distal end. The proximal end of the three pillar supports 1808(a), 1808(b), and 1808(c) may be screwed or integrally formed on the base plate, and the distal ends of the three pillar supports 1808(a), 1808(b), and 1808(c) may be fixedly attached to the pump flange 1706. The assembly of the three pillar supports 1808(a), 1808(b), and 1808(c), the base plate 910, and the pump flange 1706 may be presented as a head assembly frame, which may be further explained in detail in conjunction with FIGS. 19-24.

With continued reference to FIG. 17, the head assembly 204 may include the mixing unit. The mixing unit may include a turbulator 1708. The turbulator 1708 may be configured to receive and combine the liquor and the mixer to create a drink. In the same configuration, the turbulator 1708 may be formed as a T-shaped hollow member. The T-shaped hollow member may include a turbulator liquor inlet 1712, a turbulator mixer inlet 1714, and a mixed drink outlet 1716. The turbulator 1708 may be configured to receive the liquor from the turbulator liquor inlet 1714 and the mixer from turbulator mixer inlet 1712, and it may discharge the mixed drink through the mixed drink outlet 1716.

As further illustrated in FIG. 17, the base plate may include a liquor transfer conduit 1710(a) and a mixer transfer conduit 1710(b). The liquor transfer inlet 1710(a) may be connected to liquor protrusion 1102, and the mixer transfer conduit 1710(b) may be connected to mixer protrusion 1104. To the liquor transfer conduit 1710(a), the liquor pump inlet 1734 may be connected (refer FIG. 17), and in a similar fashion, the mixer pump inlet 1736 may be connected to the mixer transfer conduit 1710(b). Further, the liquor pump outlet 1735 may be connected to the turbulator liquor inlet 1712, and the mixer pump outlet 1737 may be connected to the turbulator mixer inlet 1714. In the same configuration, a first liquor transfer seal 1730 may be accommodated between the liquor pump inlet 1734 and the liquor transfer conduit 1710(a), and a second liquor transfer seal 1732 may be accommodated between the liquor pump outlet 1735 and the turbulator liquor inlet 1712. The first liquor transfer seal 1730 may be configured to fluidically seal the connection between the liquor pump inlet 1734 and the liquor transfer conduit 1710(a), and the second liquor transfer seal 1732 may be configured to fluidically seal the connection between the liquor pump outlet 1735 and the turbulator liquor inlet 1712. In a similar fashion, a first mixer transfer seal 1726 may be accommodated between the mixer pump inlet 1736 and the mixer transfer conduit 1710(b), and a second mixer transfer seal 1728 may be accommodated between the mixer pump outlet 1737 and the turbulator mixer inlet 1714. The first mixer transfer seal 1726 may be configured to fluidically seal the connection between the mixer pump inlet 1736 and the mixer transfer conduit 1710(b), and the second liquor transfer seal 1732 may be configured to fluidically seal the connection between the mixer pump outlet 1737 and the turbulator mixer inlet 1714.

Figure 18:
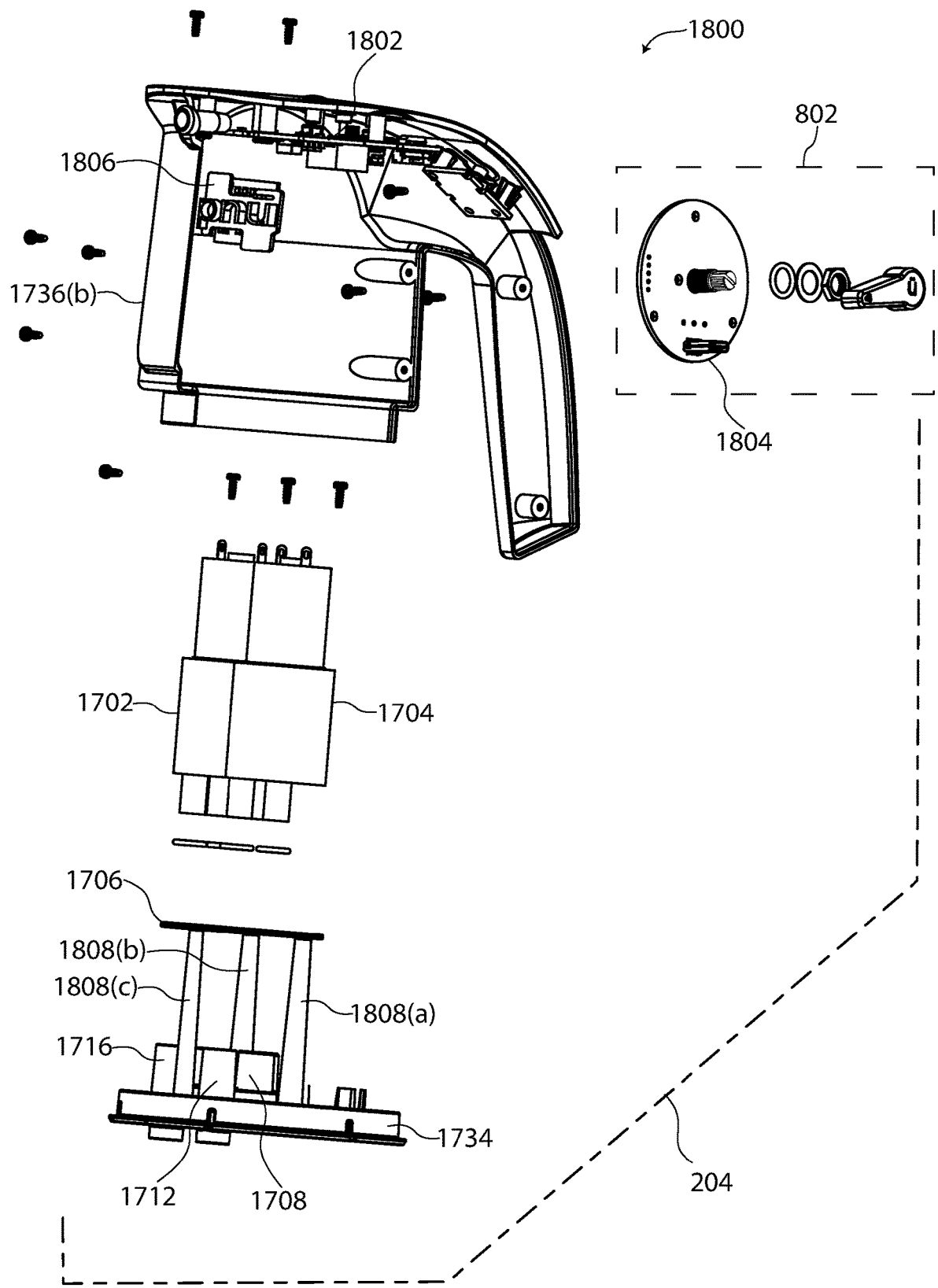
FIG. 18 illustrates a left-side exploded view of the head assembly of FIG. 10.

In another illustrative configuration, the left-side exploded view 1700 of the head assembly 204 also illustrates an exploded view of the mix adjuster 802. As seen from earlier configurations, and by way of an example, the mix adjuster 802 may utilize a rotary-input based sensor 1718 such as a potentiometer or an optical encoder. The mix adjuster 802 may include a rotary input adjuster such as a dial lever 1720 that is mechanically coupled using a fastener 1724 and a gasket 1738 to the rotary-input based sensor 1718. The rotary-input based sensor 1718 may be configured to generate a sensor signal in accordance with the rotation of the dial lever 1720. As illustrated in the configuration of FIG. 8, the mix adjuster 802 may be configured to set the ratio of liquor to mixer. With reference to FIGS. 17-18, the ratio of liquor to mixer may be set in a range from 1 to S, and the value may be selected by rotating the dial lever 1720 over the ranges of mix values. The rotary-input based sensor 1718 may be configured to sense the rotation of the dial lever 1720, and it may be configured to generate the signal. By way of an example, when the mix value of "1" is selected, a sensor signal may be generated by the rotary-input based sensor 1718 to represent the requirement to mix 1 part liquor and 1 part mixer.

With reference to FIG. 18, in another illustrative configuration, the head assembly 204 may include at least one electronic circuit board. The at least one electronic circuit board may include a main circuit board 1802 and a daughter circuit board 1804. The main circuit board 1802 may be connected to the daughter circuit board 1804 using a wired connection or any wireless connection known in the art. The main circuit board 1802 may include a main processing unit (not shown in the figure), and the daughter circuit board 1804 may include a daughter processing unit (also not shown in the figure). The processing units of the main circuit board 1802 and the daughter circuit board 1804 may include microprocessors or systems on chips (SoC). The main circuit board 1802 may be connected to the liquor pump 1702 and the mixer pump 1704. The main circuit board 1802 may be further connected to the dispense trigger 810, the power switch 812, and the rate adjuster 814. Further, the main circuit board 1802 may be fixated to a support block 1810. The support block may be formed in either the first head assembly casing 808(a) or the second head assembly casing 808(b) (refer FIG. 17). Similarly, the daughter circuit board

1804 may be accommodated in the second head assembly casing 808(*b*). The second head assembly casing 808(*b*) may include a circular profile into which the daughter circuit board 1804 may be accommodated. Further, the main circuit board 1802 and the daughter circuit board 1804 may be fastened to the support block 1810 and to the circular profile using any fasteners known in the art.

Referring again to FIG. 17, in another configuration, the sensor signals generated by the rotary-input based sensor 1718 may be received by the daughter circuit board 1804, which may be connected to the rotary-input based sensor 1718. The daughter circuit board 1804 may be configured to process the sensor signal and may be configured to generate at least one operational signal for the liquor pump 1702 and the mixer pump 1704. The at least one operational signal may be transmitted to the main circuit board 1802. The main processing unit of the main circuit board 1802 may be configured to process the at least one operational signal, and it may be configured accordingly to controllingly operate the liquor pump 1702 and the mixer pump 1704. In the same configuration, the sensor signals generated by the rotary-input based sensor 1718 may be an electric voltage signal. Further, the at least one operating signal generated by the daughter processing unit by processing the sensor signal may be a pulse-width-modulation (PWM) signal. More particularly, the operational signal transmitted to the main circuit board 1802 may include a liquor pump PWM signal and a mixer pump PWM signal. After receiving the liquor pump PWM signal and the mixer pump PWM signal, the main circuit board 1802 may be configured to operate the liquor pump 1702 and the mixer pump 1704 to draw the liquor and the mixer from the container assembly 202 in a ratio as selected by the user using the mix adjuster 802.

In another configuration, the dispense trigger 810, the power switch 812, and the rate adjuster 814 may be connected to the main circuit board 1802. The dispense trigger 810, the power switch 812, and the rate adjuster 814, when actuated, may generate a voltage signal to activate the liquor pump 1702 or the mixer pump 1704, to turn ON/OFF the beverage dispenser 102 to conserve power from the electric battery, or to increase the flow rate of the dispensed drink, respectively.

Referring again to FIG. 18, in another illustrative configuration, and as illustrated by way of an example, the illuminated branding may include an LED array 1806. The LED array 1806 may be connected to and controlled by the main circuit board 1802 whereby the state (e.g., on/off) of the beverage dispenser 102 can be displayed and the brightness, color output, flash frequency, and other parameters can be varied in order to communicate information to the user. By way of an example, the LED array 1806 may be controlled to display a pattern and/or temporal sequence of colors which communicates information to the user. In another example, the LED array 1806 may be controlled to flash the illuminated branding with a range of frequencies to communicate information to a viewer. Such an implementation may function primarily as a symbolic user interface. In one example, the LED array 1806 may initiate an LED behavior to remind the user to dispense the drink after the drink has been created by the turbulator 1708. In another example, the LED array 1806 may initiate another LED behavior to confirm an action. For example, it might indicate that the electric batteries need to be recharged, or it might indicate the absence or depletion of liquor and/or mixer in the container assembly 202.

Figure 19:
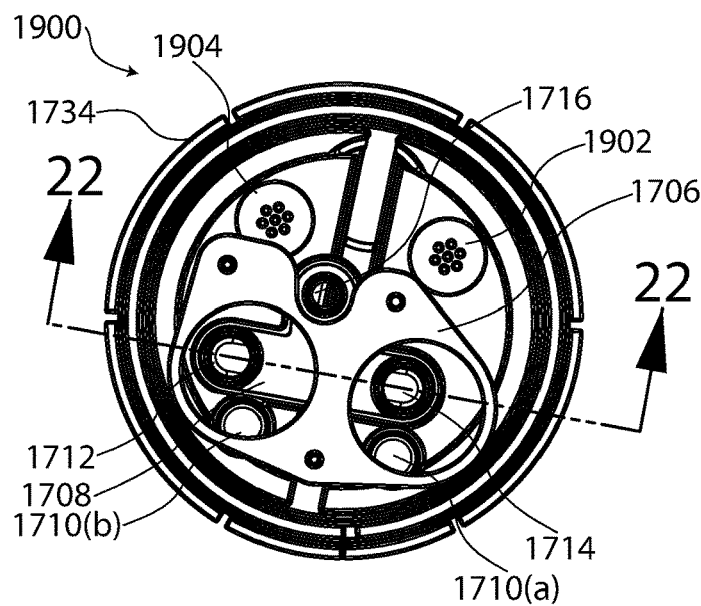
FIG. 19 illustrates a top view a head assembly frame.

FIG. 19 illustrates a top view 1900 of one configuration of a head assembly frame wherein the base plate 910 may include at least one air vent. The at least one air vent may include a first air vent 1902 and a second air vent 1904. The first air vent 1902 and the second air vent 1904 may be formed on the base plate 910 to allow recovery air to enter containers holding of the liquor and the mixer within the beverage dispenser 102. For example, the first air vent 1902 and the second air vent 1904 may allow equilibrium of the pressures within and outside of the beverage dispenser 102. Such equilibrium may allow easy separation of the container assembly 202 and the head assembly 204, which may not be possible if vacuum may be present in the beverage dispenser 102.

Figure 20:
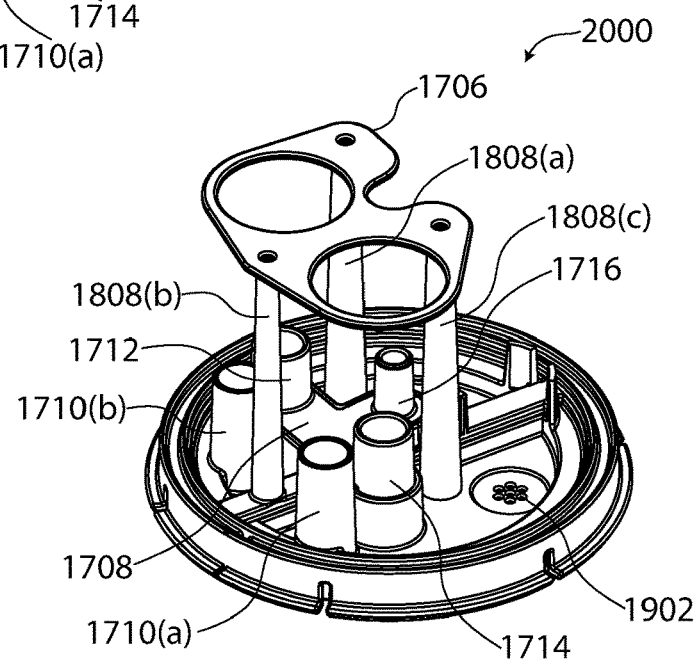
FIG. 20 illustrates a perspective view of the head assembly frame.

FIG. 20 illustrates a perspective view 2000 of the head assembly frame wherein a head assembly frame is illustrated. As explained earlier, and by way of an example, the head assembly frame may include the assembly of the three pillar supports 1808(*a*), 1808(*b*), and 1808(*c*), the base plate 910, and the pump flange 1706.

Figure 21:
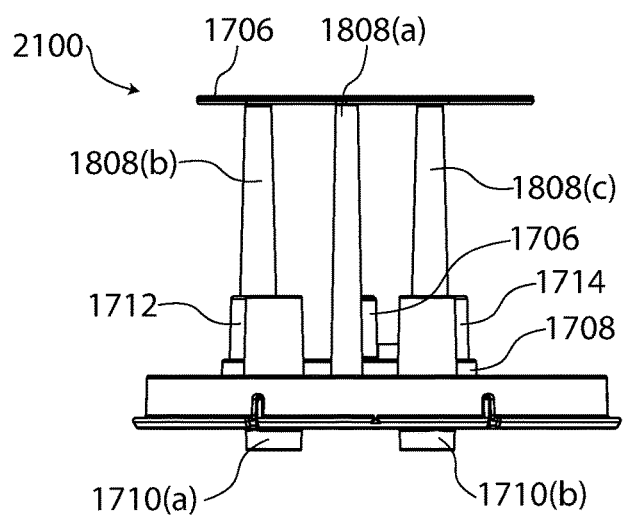
FIG. 21 illustrates a side view of the head assembly frame.

FIG. 21 illustrates a side view 2100 of the head assembly frame. As illustrated, the pump flange 1706 may be offset to the base plate 910 by a length of the three pillar supports 1808(*a*), 1808(*b*), and 1808(*c*), thereby providing sufficient space to accommodate the liquor pump 1702, the mixer pump 1704, and the turbulator 1708 therebetween. Referring to FIG. 20, and by way of an example illustrated by the configuration of FIG. 18, the pump flange 1706 may be offset to the base plate 910 by affixing the proximal end of the three pillar supports 1808(*a*), 1808(*b*), and 1808(*c*) to the base plate and affixing the distal ends of the three pillar supports 1808(*a*), 1808(*b*), and 1808(*c*) to the pump flange 1706.

FIG. 22 illustrates a sectional view 2200 of the head assembly frame taken across plane 22-22 (FIG. 19). FIG. 23 illustrates a right-side exploded view 2300 of the head assembly frame. FIG. 24 illustrates another right-side exploded view 2400 of the head assembly frame. With reference to FIG. 22, in an illustrative configuration, the turbulator 1708 may be disposed between the base plate 910 and the pump flange 1706. The turbulator 1708, as explained earlier, may include a T-shaped hollow member. Now, referring to FIG. 22, the T-shaped member may include an upper plate 2204. The upper plate 2204 may include the turbulator liquor inlet 1714, the turbulator mixer inlet 1712, and the mixed drink outlet 1716. The upper plate 2204 may be placed on a T-shaped profile 2304 (refer to FIG. 23) formed on the base plate 910 and at an offset from the base plate 910 to create a mixing chamber 2202 therebetween. As explained earlier, and by way of exemplary arrows illustrated in the configuration of FIG. 22, the mixer may be received by the turbulator mixer inlet 1712, and the liquor may be received by the liquor inlet 1714. Further, the liquor and the mixer may be mixed or combined in the mixing chamber 2202 to create the drink. Further, the drink may be transmitted to the nozzle 902 through the mixed drink outlet 1716.

Figure 25:
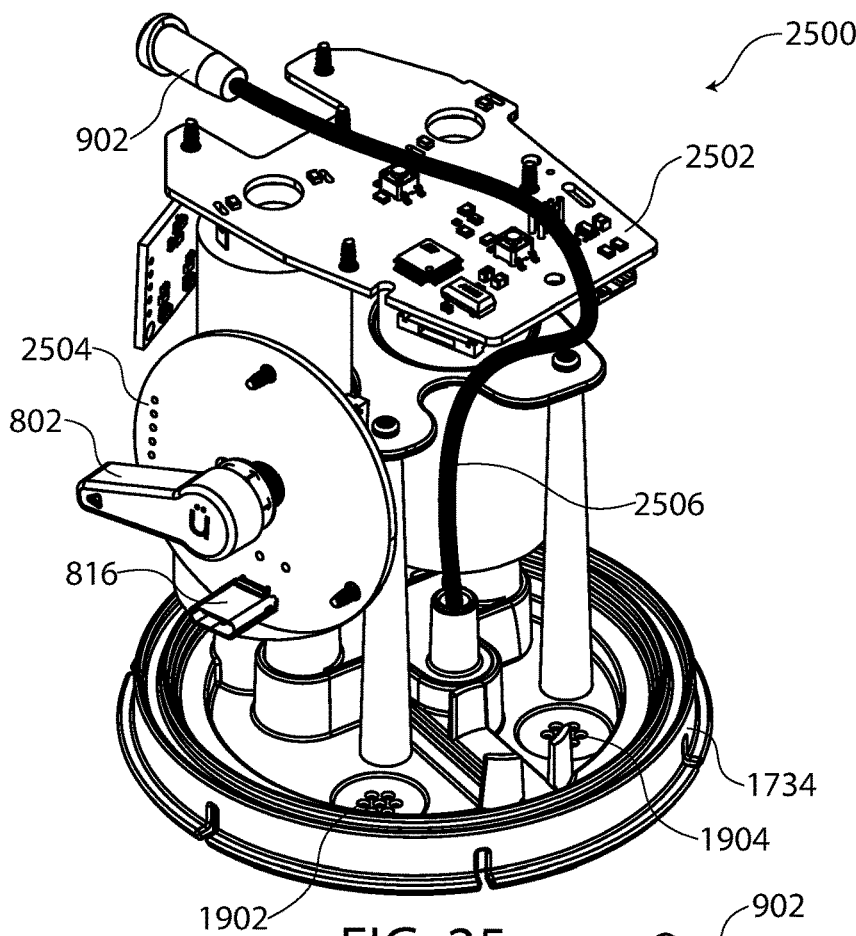
FIG. 25 illustrates a perspective view of internal assembly of the head assembly.
Figure 26:
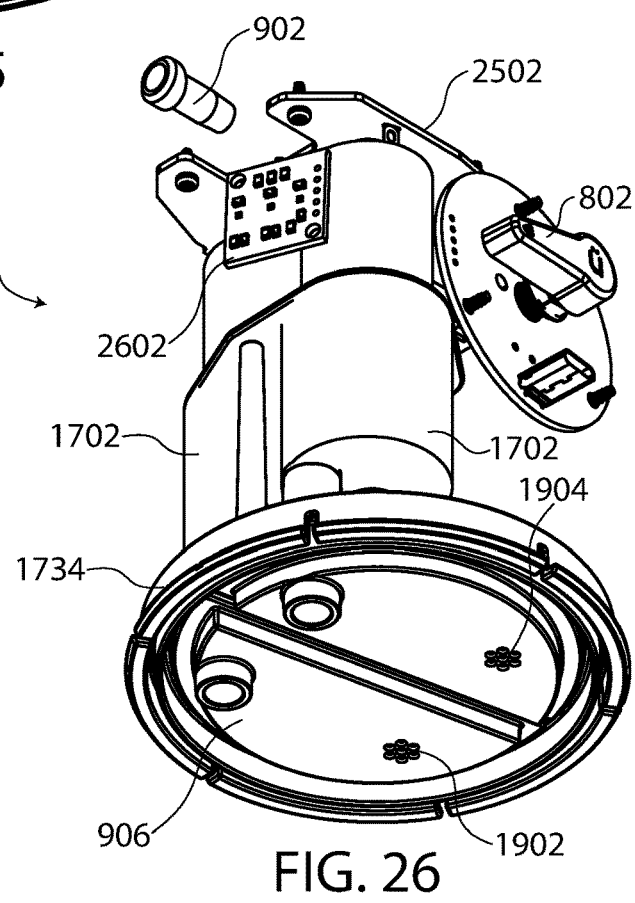
FIG. 26 illustrates a bottom-perspective view of the internal assembly of the head assembly of FIG. 25.
Figure 27:
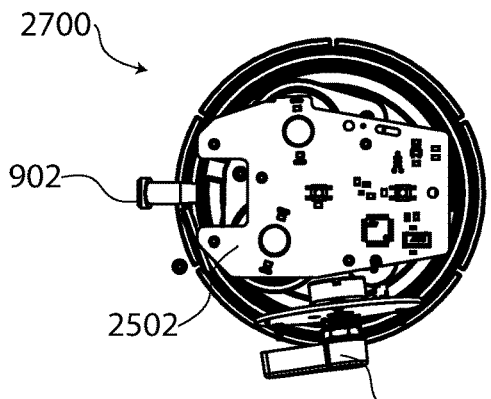
FIG. 27 illustrates a top view of the internal assembly of the head assembly.
Figure 28:
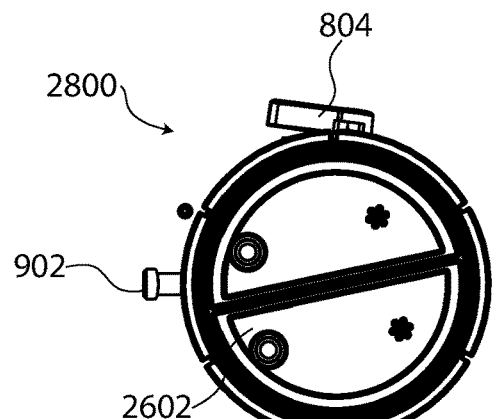
FIG. 28 illustrates a bottom view of the internal assembly of the head assembly.
Figure 29:
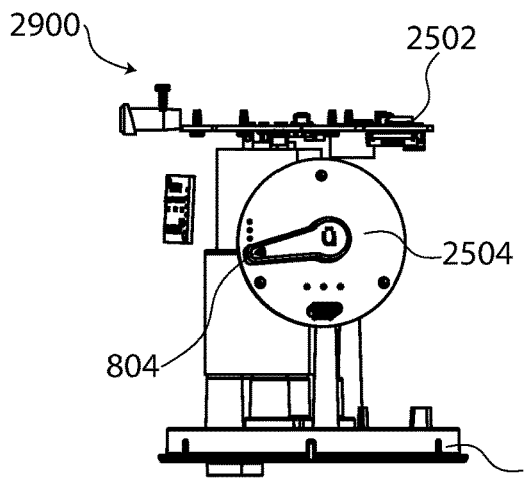
FIG. 29 illustrates a left view of the internal assembly of the head assembly.
Figure 30:
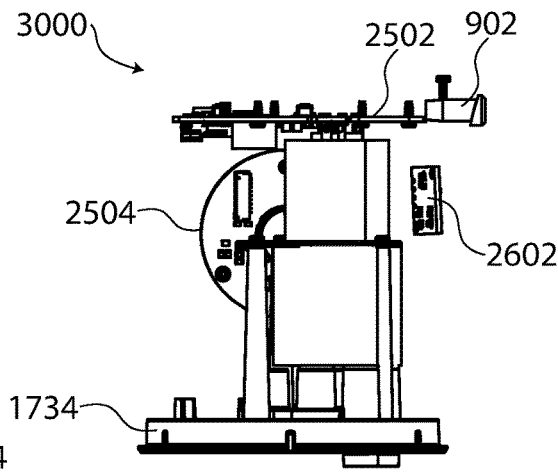
FIG. 30 illustrates a right view of the internal assembly of the head assembly.
Figure 31:
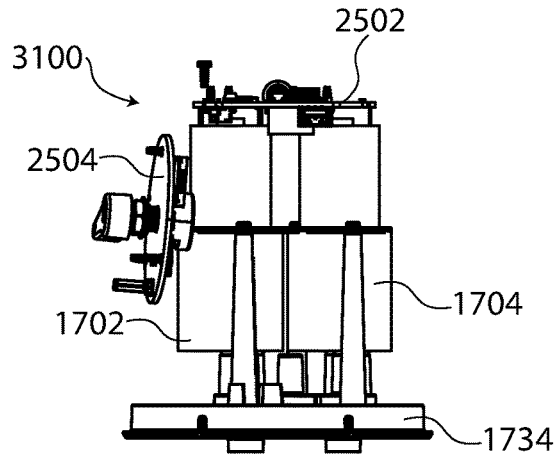
FIG. 31 illustrates a front view of the internal assembly of the head assembly.
Figure 32:
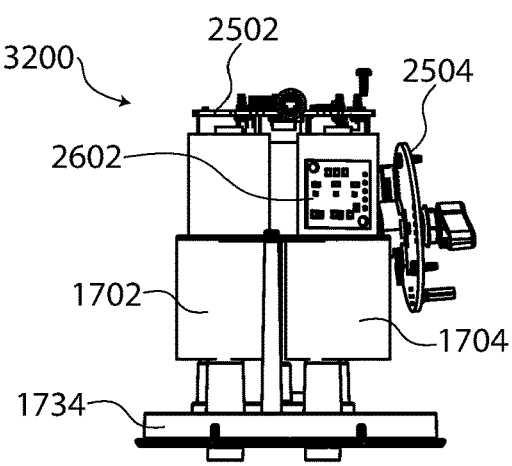
FIG. 32 illustrates a rear view of the internal assembly of the head assembly.

In one illustrative configuration, FIG. 25 illustrates a perspective view 2500 of an internal assembly of the head assembly 204. FIG. 26 illustrates a bottom-perspective view 2600 of the internal assembly of the head assembly 204. FIG. 27 illustrates a top view 2700 of the internal assembly of the head assembly 204. FIG. 28 illustrates a bottom view 2800 of the internal assembly of the head assembly 204. FIG. 29 illustrates a right view 2900 of the internal assembly of the head assembly 204. FIG. 30 illustrates a left view 3000 of the internal assembly of the head assembly 204. FIG. 31 illustrates a rear view 3100 of the internal assembly of the head assembly 204. FIG. 32 illustrates a front view 3200 of the internal assembly of the head assembly 204.

In one illustrative configuration, referring to FIGS. 25-32, and by way of an example illustrated earlier, the liquor pump 1702 and the mixer pump 1704 may be held in the pump flange 1706. Further, the liquor pump 1702 and mixer pump 1704 may include electronic terminals which may be soldered to the main circuit board 1802 so that an electric connection may be established between the liquor pump 1702, mixer pump 1704, and the main circuit board 1802. In the same configuration, the dial lever 1720 may be connected to the rotary-input based sensor 1718 (not shown in the figure). In the same configuration, the rotary-input based sensor 1718 may be soldered to the daughter circuit board 1804, and as explained earlier, the dial lever 1720 may be mechanically coupled to the rotary-input based sensor 1718. Further, the charging port 816 may be electrically connected to the daughter circuit board 1804.

In one illustrative configuration, with continued reference to FIG. 25, the head assembly 204 may further include a connector hose 2502. The connector hose 2502 may be configured to connect the mixed drink outlet 1716 and the nozzle 902. In an exemplary configuration, the drink created in the turbulator 1708 may be transmitted to the nozzle 902 through the connector hose 2502. Further, and as explained earlier, the nozzle 902 may be configured to dispense the mixed drink.

In one illustrative configuration, referring to FIGS. 26-32, the head assembly 204 may further include an LED circuit 2602. The LED circuit 2602 may be configured to control the illumination of LED array 1806. The LED circuit 2602 may be connected to the main circuit board 1802 through a wired connection. In another configuration, the processor unit may receive an input status from the dispense trigger 810, the power switch 812, and the rate adjuster 814 to control the brightness, color output, flash frequency, and other parameters that can be varied to communicate information to the user as already explained in conjunction with FIG. 18.

Figure 33:
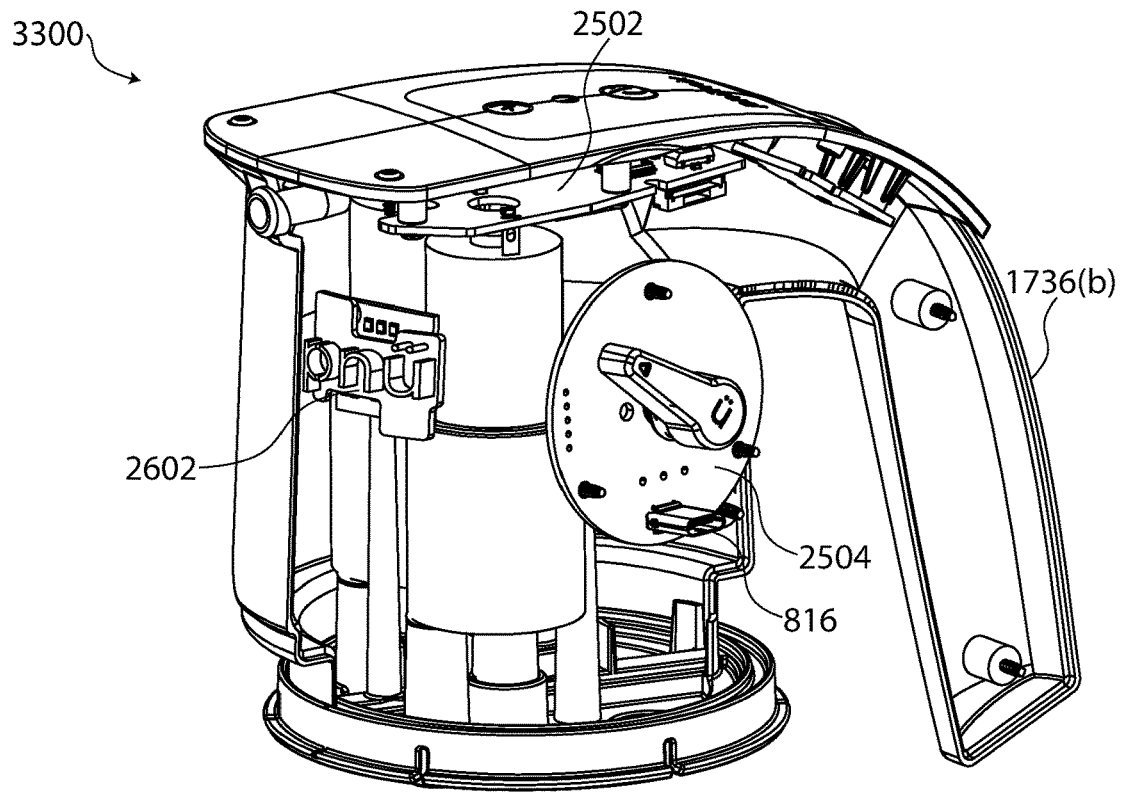
FIG. 33 illustrates a right view of the head assembly.

FIG. 33 illustrates a right view 3300 of an illustrative configuration of the head assembly 204.

Figure 34:
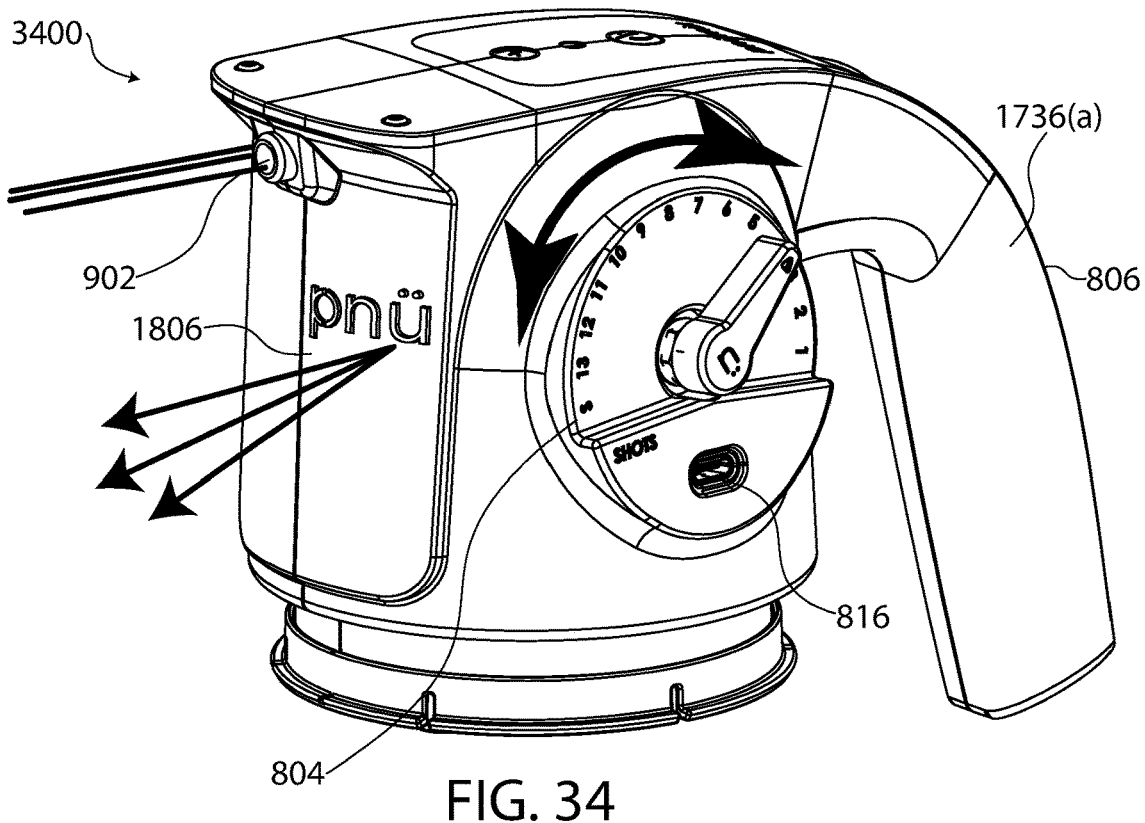
FIG. 34 illustrates an operational view of the head assembly.

FIG. 34 illustrates an operational view 3400 of a configuration of the head assembly 204 wherein the user may charge the electric batteries through the charging port 816. Ensuring that the electric batteries have been charged as desired, the status thereof may be illustrated by an LED array 1806. The user may actuate the power switch 812 to turn the beverage dispenser 102 ON. Further, the user may be configured to adjust a ratio of liquor and mixer by selecting a mix value, i.e., by rotating the dial lever 1720 to a mix value between 1 and S. After selection of the mix value, the user may be configured to actuate the dispense trigger 810, and as a result, the rotary-input based sensor 1718 may be configured to generate a sensor signal which may be processed by the daughter circuit board 1804. The daughter circuit board 1804, may be configured to generate the at least one operational signal for the liquor pump 1702 and the mixer pump 1704 and to transmit the at least one signal to the main circuit board 1802 based on the processing. After receiving the signal, the main circuit board 1802 may be configured to operate the liquor pump 1702 and the mixer pump 1704 to draw the liquor and mixer from the container assembly 202 in the ratio defined by the mix value. Under the action of the liquor pump 1702 and the mixer pump 1704, the liquor may be drawn from the assembly of the liquor conduit 610 through the liquor port 408, liquor protrusion 1102, and the liquor transfer inlet 1710(*a*) to the liquor pump inlet 1734 of the liquor pump 1702. Similarly, the mixer may be drawn from the assembly of the mixer conduit 612, mixer port 410, mixer protrusion 1104, and the mixer transfer conduit 1710 (*b*) to the mixer pump inlet 1736 of the mixer pump 1704. The liquor pump 1702 may be configured to transmit the liquor received from the liquor pump 1734 to the liquor pump outlet 1735. Similarly, the mixer pump 1704 may be configured to transmit the mixer received from the mixer pump inlet 1736 to the mixer pump outlet 1737. As illustrated earlier, the liquor pump outlet 1735 may be connected to the turbulator liquor inlet 1714 and the mixer pump outlet 1737 may be connected to the turbulator mixer inlet 1712. Liquor from the liquor pump outlet 1743(*b*) may be transmitted to the turbulator 1708 through the turbulator liquor inlet 1714, and mixer from the mixer pump outlet 1737 may be transmitted to the turbulator 1708 through the turbulator mixer inlet 1712. The liquor and the mixer may be combined in the mixing chamber 2202, thereby creating the mixed drink. Further, during and/or after actuation of the dispense trigger 810, the mixed drink may be transmitted to the nozzle 902 from the mixed drink outlet 1716 under the action of the liquor pump 1702 and the mixer pump 1704 through the connector hose 2502. The drink may be dispensed from the nozzle in a laminar flow, thereby avoiding any spillage. Further, the user may actuate rate adjuster 814 to increase the flow rate of the dispensed drink. After the drink may be completely dispensed and the container assembly 202 may be completely depleted, the LED array 1806 may indicate the status of depletion to the user, who may then turn off the beverage dispenser 102 by actuating the power switch 812 or refill the container assembly 202 as desired.

Figure 35:
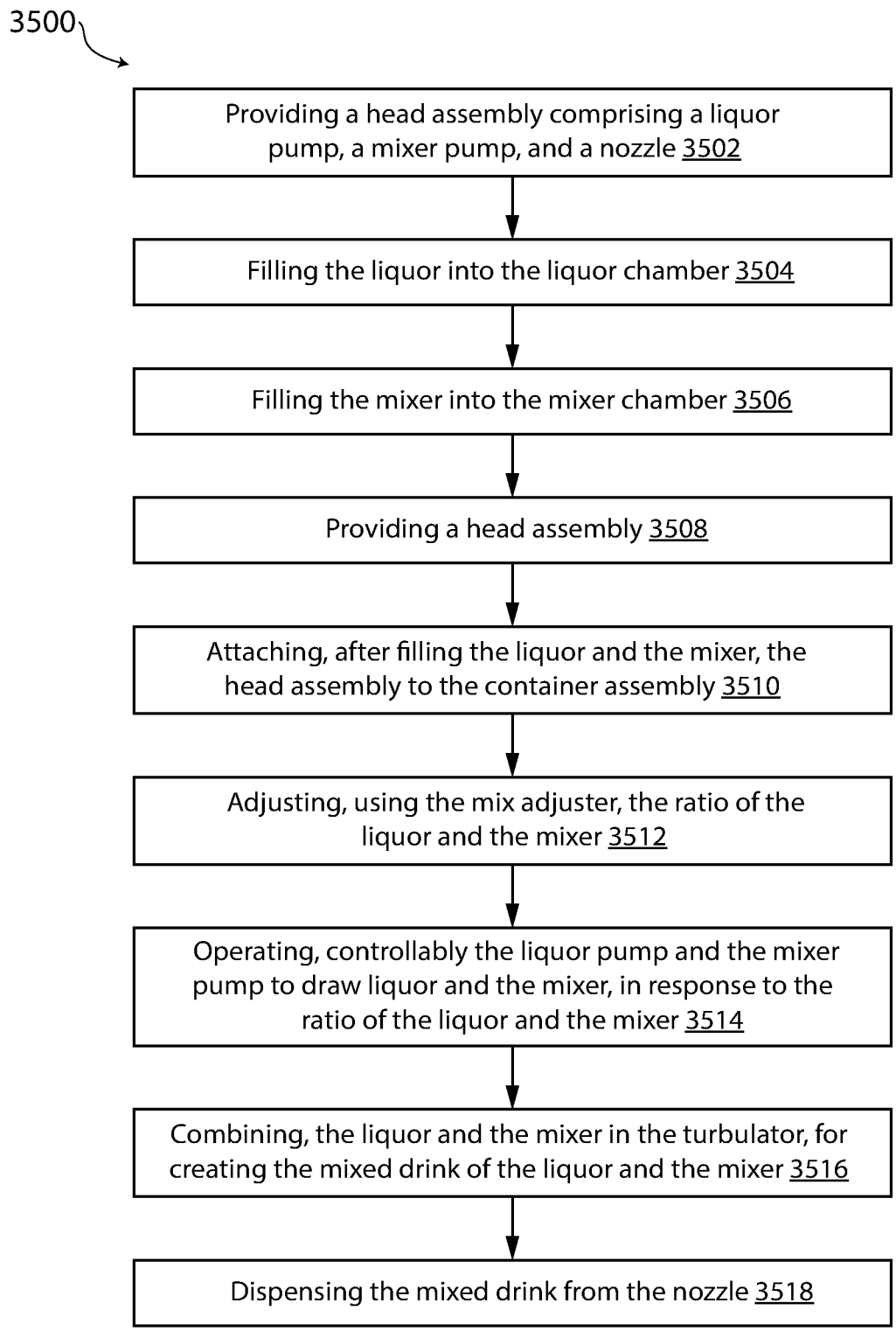
FIG. 35 illustrates a flow chart of a beverage creation method of creating and dispensing the mixed drink using the beverage dispenser of FIG. 1.

FIG. 35 illustrates a flow chart 3500 of a beverage creation method to create a mixed drink of liquor and mixer using the beverage dispenser 102. The beverage dispenser 102 may be configured to create a mixed drink of liquor and mixer which may be obtained from the container assembly 202. While mixing the drink, the beverage dispenser 102 may be configured to dispense the mixed drink.

At step 3502, a container assembly 202 may be provided. The container assembly 202 may include a mixer chamber 304 configured to store the mixer. The mixer chamber 304 may further define a mixer fill hole 404. Further, a liquor chamber 302 may be inserted into the mixer chamber 304. To the mixer fill hole 404, the separator plate 406 may be adjoined using ultrasonic welding. The container assembly 202 may include a liquor fill hole 402 in fluid communication with the liquor chamber 302. The container assembly 202 may include the liquor fill hole 402 with the mixer chamber 304. Further, a liquor conduit 610 may be connected to the liquor port 408. The liquor conduit 610 may include a proximal end and a distal end disposed opposite the proximal end. The proximal end of the liquor conduit 610 may be placed deeply in the liquor chamber 302, and the distal end of the liquor conduit 610 may be in fluid communication with the liquor port 408. Similarly, a mixer conduit 612 may be connected to the mixer port 410. The mixer conduit 612 may also include a proximal end and a distal end disposed opposite to the proximal end. The proximal end of the mixer conduit 612 may be placed deeply within the mixer chamber 304, and the distal end may be in fluid communication with the mixer port 410.

At step 3504, the liquor chamber 302 may be filled with liquor. Liquor may include an alcoholic drink such as vodka, gin, whiskey, and the like. The liquor chamber 302 may be filled through the liquor fill hole 402 in a configuration explained in conjunction with FIG. 5. Further, at step 3506, the mixer chamber 304 may be filled with a mixer suitable for the liquor, i.e., flavored fluids which may easily be combined with the liquor. Examples of mixers may include instant pre-mixes for cocktail drinks such as pre-mixes for margarita, which may be easily combined with vodka/gin. Other examples of mixers may also include sour mixes or syrups such as agave syrup, sugar syrups, triple sec/Cointreau, and the like.

At step 3508, a head assembly 204 may be provided. The head assembly 204 may include a liquor pump 1702 and a mixer pump 1704. The head assembly 204 may further include a turbulator 1708. The turbulator 1708 may include a turbulator liquor inlet 1714, a turbulator mixer inlet 1712, and a mixed drink outlet 1716. The liquor pump 1702 and the mixer pump 1704 may be fluidically connected to the turbulator 1708, the turbulator liquor inlet 1714, and the turbulator mixer inlet 1712 as explained in conjunction with FIGS. 17-18. The liquor pump 1702 may be in fluid communication with the liquor conduit 610, and the mixer pump 1704 may be in fluid communication with the mixer conduit 612. Using this fluid communication, the liquor pump 1702 and the mixer pump 1704 may be configured to draw and transmit the liquor and the mixer to the turbulator 1708. The turbulator 1708 may be configured to mix the liquor and the mixer, and it may be configured to transmit the mixed drink to the mixed drink outlet 1716. A nozzle 902 may be fluidically communicated with the mixed drink outlet 1716, and it may be configured to dispense the mixed drink received from the mixed drink outlet 1716. The head assembly 204 may further include an electronics circuit board. The electronics circuit board may be further connected to the liquor pump 1702 and the mixer pump 1704. The electronics circuit board may include a main circuit board 1802 connected to the liquor pump 1702 and the mixer pump 1704 and a daughter circuit board 1804 connected to the main circuit board 1802. To the daughter circuit board 1804, a mix adjuster 802 may be connected. The mix adjuster 802 may be configured to adjust the ratio of the liquor and the mixer and to generate a sensor signal. The sensor signal may be processed by the daughter circuit board 1804 to generate at least one operational signal, and the daughter circuit board 1804 may transmit the operational signal to the main circuit board 1802.

At step 3510, the head assembly 204 may be attached to the container assembly 202 after the container assembly 202 may have been filled with liquor and mixer. The head assembly 204 may include a threaded collar 804 which may be rotated vertically downwards and may tighten the head assembly 204 onto the container assembly 202.

At step 3512, the ratio of the liquor and the mixer may be adjusted and set using the mix adjuster 802. The mix adjuster 802 may be further configured to generate the sensor signal representative of the set ratio of liquor to mixer. The sensor signal may be processed by the daughter circuit board 1804 to generate at least one operational signal, and the daughter circuit board 1804 may transmit the operational signal to the main circuit board 1802.

At step 3514, in response to the operational signal, the liquor pump 1702 and the mixer pump 1704 may be operated by the main circuit board 1802 to draw the liquor and the mixer in accordance with the ratio. As illustrated earlier, the liquor pump 1702 and the mixer pump 1704 may be configured to draw and transmit the liquor and the mixer from the container assembly 202 to the turbulator 1708. As illustrated earlier, the liquor pump 1702 and the mixer pump 1704 may be configured to draw and transmit the liquor and the mixer from the container assembly 202 to the turbulator 1708.

At step 3516, the liquor and the mixer received in the turbulator 1708 may be combined to create a mixed drink. The mixed drink may be further transmitted to the nozzle 902 from the mixed drink outlet 1716 through the connector hose 2502 connecting the nozzle 902 and the mixed drink outlet 1716. At step 3518, the mixed drink may be discharged from the nozzle 902 in a laminar flow as illustrated by FIG. 1.

Figure 36:
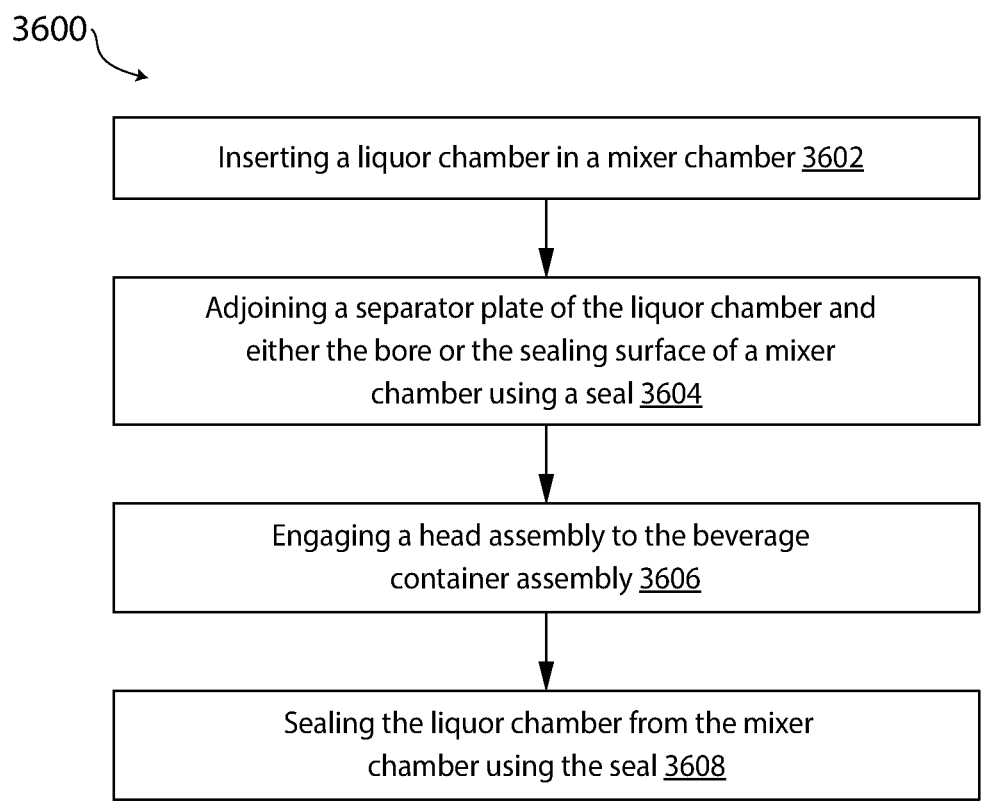
FIG. 36 illustrates a flow chart of a sealing method for the beverage dispenser.

Referring to FIG. 36, a flow chart 3600 of a method of sealing the liquor chamber 302 and the mixer chamber 304 in the container assembly 202 may be illustrated. At step 3602, a liquor chamber 302 may be inserted into a mixer chamber 304. The mixer chamber 304 may define a bore or a mixer chamber opening. The mixer chamber opening may include a finish, which may be coaxial to the central axis of the container assembly 202. The finish may further include a sealing surface and external thread which may engage the threaded collar 804 of the head assembly 204. The liquor chamber 302 may further include a separator plate 406 ultrasonically welded thereto.

At step 3604, a separator plate 406 may be adjoined either to the sealing surface or to the mixer chamber opening using a seal. The seal may include a top seal 602 between the separator plate 406 and the finish and a bottom seal 608 positioned above the separator plate 406. The top seal 602 and the bottom seal 608 may include custom-made torrid seal, the planer profile, or a flange seal. Further, at step 3606, the head assembly 204 may be engaged to the container assembly 202. The head assembly 204 may include the threaded collar 804. The threaded collar 804 may include internal screw threads 904, which may be configured to engage the external threads on the finish of the mixer chamber opening. At step 3608, after attaching, the liquor chamber and the mixer chamber may be separated and sealed using the top seal 602 and the separator plate 406.

Figure 37:
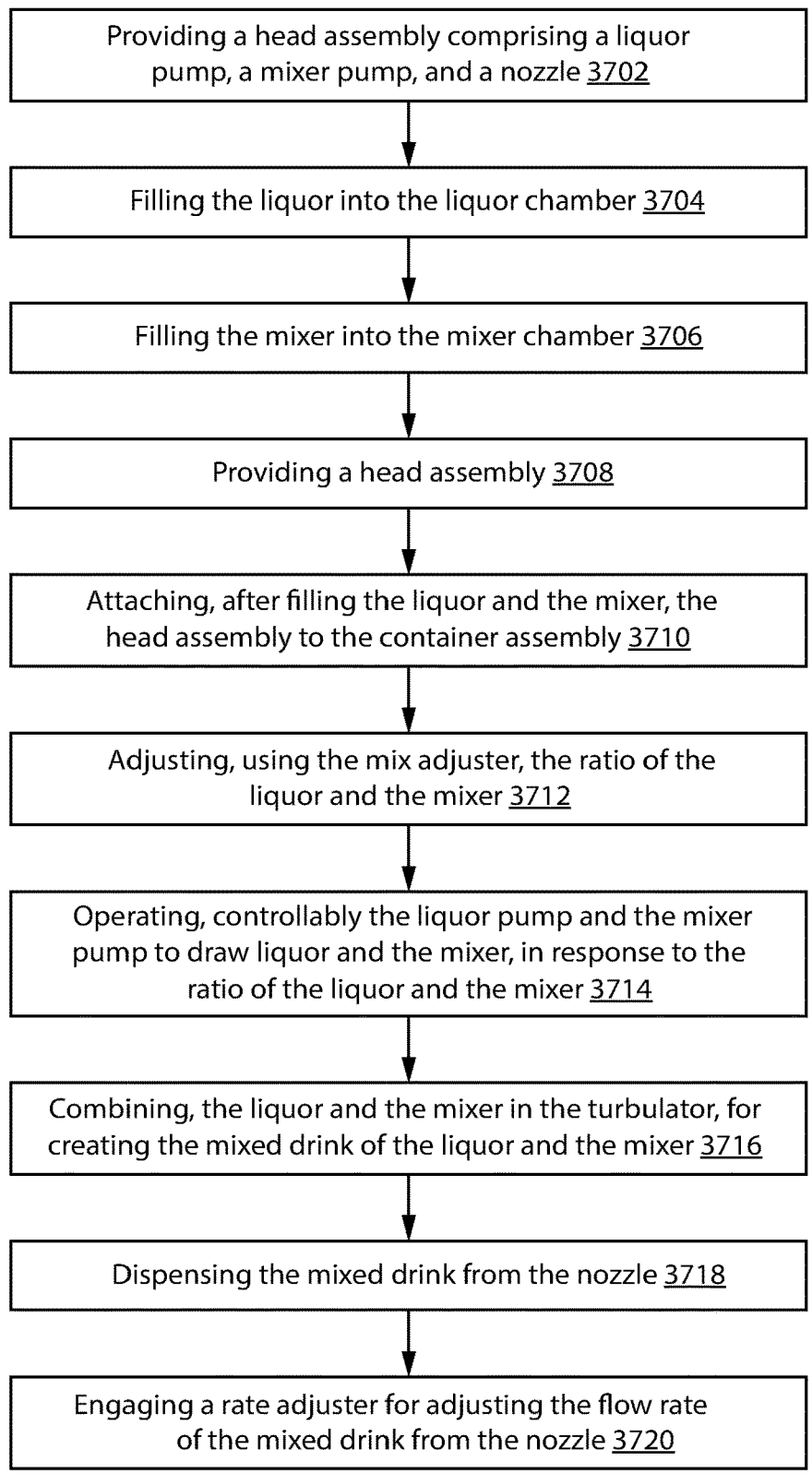
FIG. 37 illustrates a flow chart of an adjustment method of adjusting the flow rate during dispensing of the mixed drink using the beverage dispenser of FIG. 1.
Figure 38:
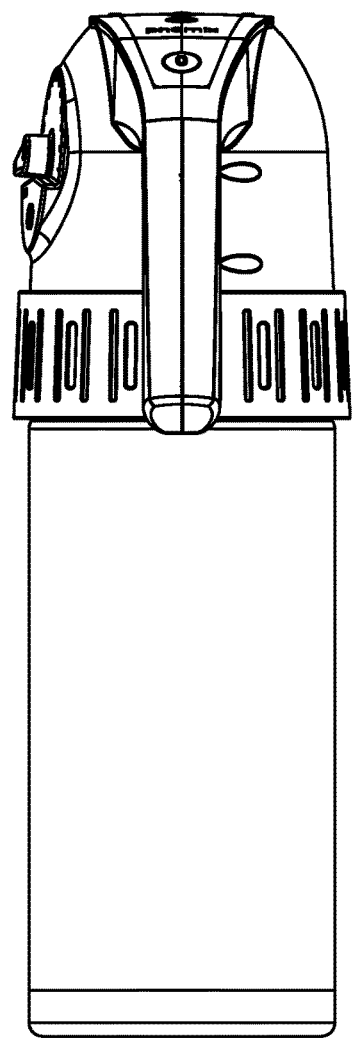
FIG. 38 illustrates a rear view of the beverage dispenser.
Figure 39:
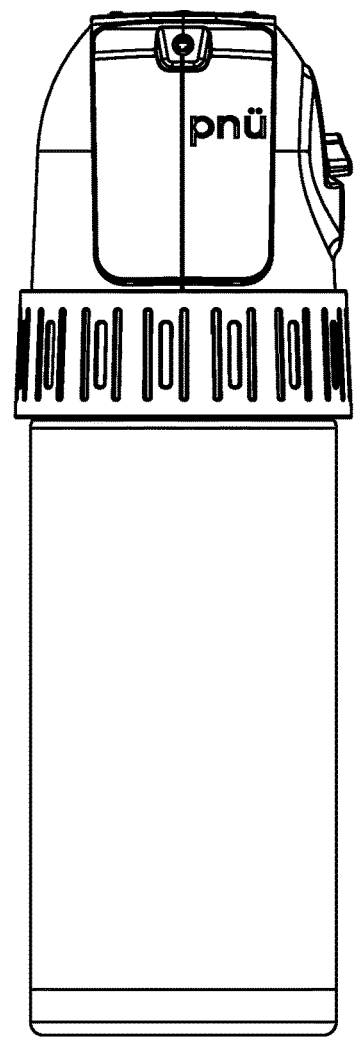
FIG. 39 illustrates a front view of the beverage dispenser of FIG. 38.
Figure 40:
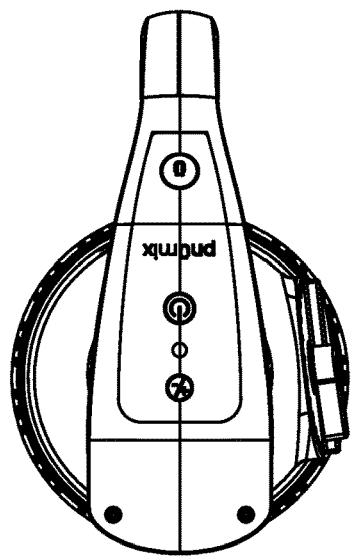
FIG. 40 illustrates a top view of the beverage dispenser of FIG. 38.
Figure 41:
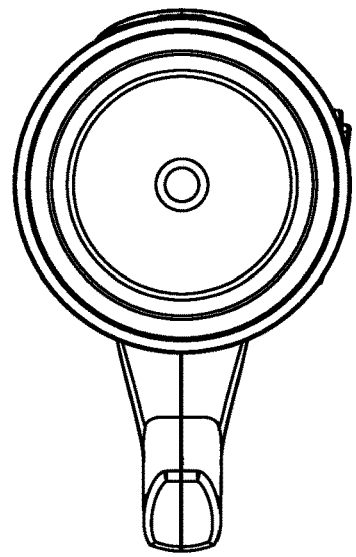
FIG. 41 illustrates a bottom view of the beverage dispenser of FIG. 38.
Figure 42:
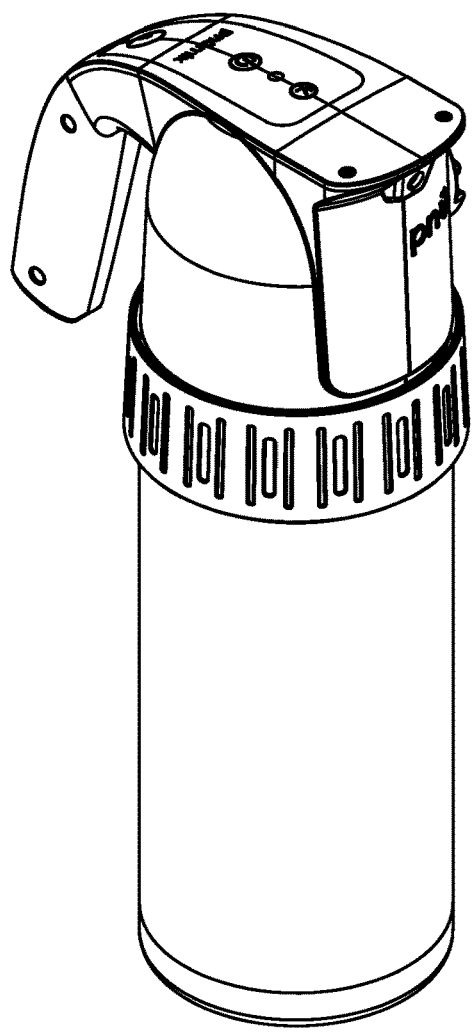
FIG. 42 illustrates a left perspective view of the beverage dispenser of FIG. 38.
Figure 43:
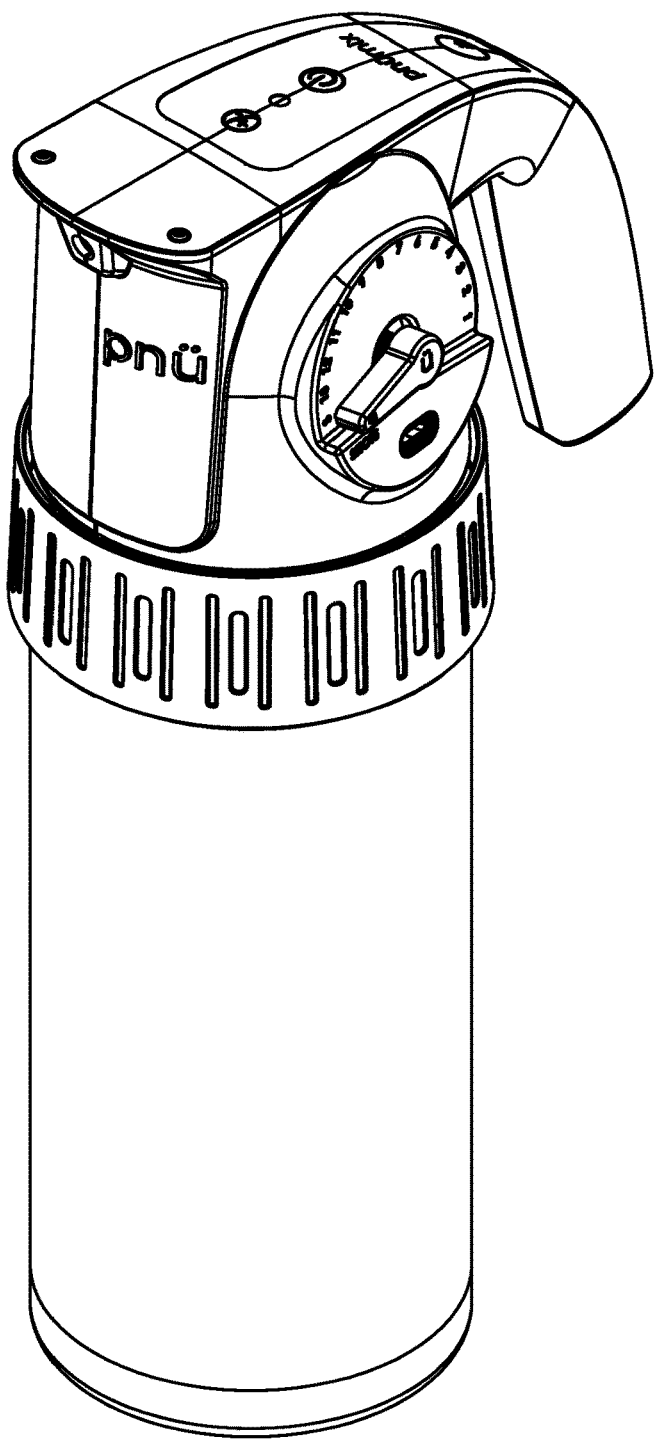
FIG. 43 illustrates a right perspective view of the beverage dispenser of FIG. 38.
Figure 44:
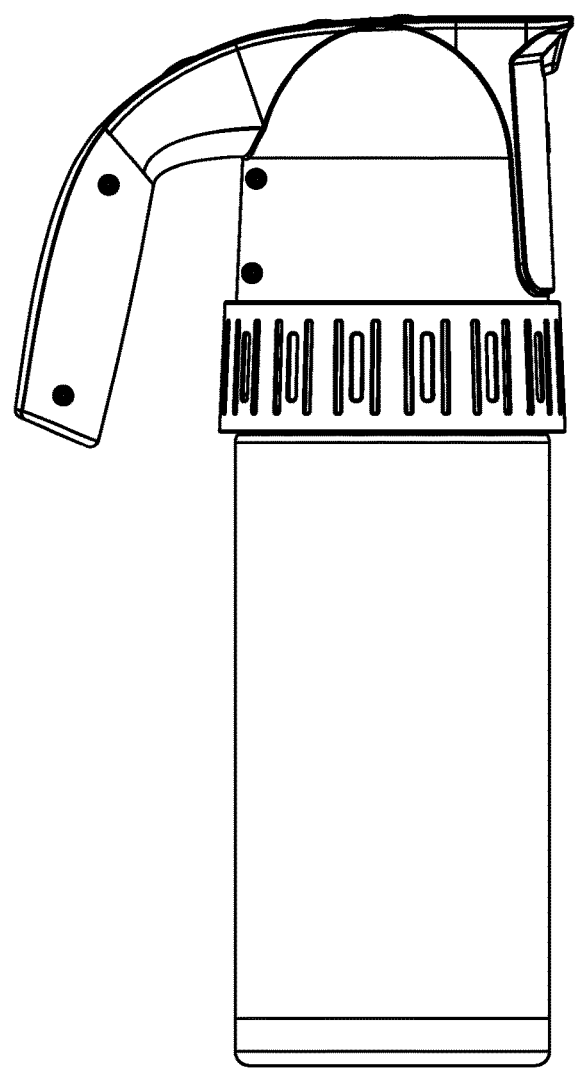
FIG. 44 illustrates a left view of the beverage dispenser of FIG. 38.
Figure 45:
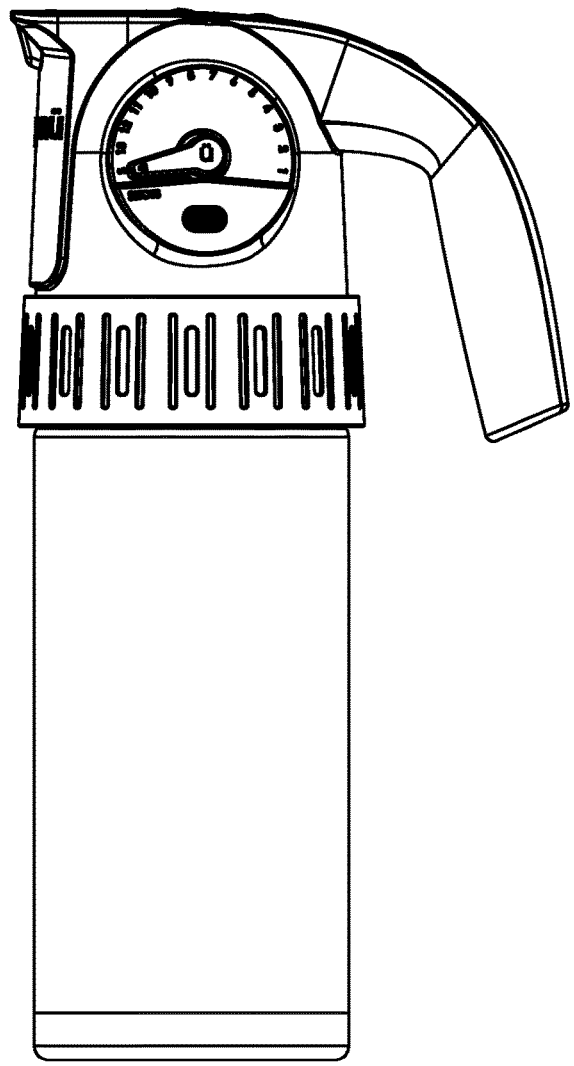
FIG. 45 illustrates a right view of the beverage dispenser of FIG. 38.

FIG. 37 illustrates a flow chart 3700 of a method of adjusting the flow rate of a mixed drink being dispensed from the beverage dispenser. The beverage dispenser 102 may be configured to create a mixed drink of liquor and mixer which may be obtained from the container assembly 202 by the head assembly 204. After the creation of the mixed drink, the beverage dispenser 102 may be configured to dispense the mixed drink. The head assembly 204 may include a rate adjuster 814 which may be configured to increase the flow rate of the mixed drink dispensed from the head assembly 204.

At step 3702, a container assembly 202 may be provided. The container assembly 202 may include a mixer chamber 304 configured to store the mixer. The mixer chamber 304 may further define a mixer chamber opening. Further, a liquor chamber 302 may be inserted into the mixer chamber opening. To the mixer chamber opening, the separator plate 406 may be adjoined using ultrasonic welding. The container assembly 202 may include a liquor fill hole 402 in fluid communication with the liquor chamber 302. The container assembly 202 may include the liquor fill hole 402 with the mixer chamber 304. Further, a liquor conduit 610 may be connected to the liquor fill hole 402. The liquor conduit 610 may include a proximal end and a distal end disposed opposite the proximal end. The proximal end of the liquor conduit 610 may be placed deeply in the liquor chamber 302, and the distal end of the liquor conduit 610 may be in fluid communication with the liquor fill hole 402. Similarly, a mixer conduit 612 may be connected to the liquor fill hole 402. The mixer conduit 612 may also include a proximal end and a distal end disposed opposite to the proximal end. The proximal end of the mixer conduit 612 may be placed deeply within the mixer chamber 304, and the distal end may be in fluid communication with the liquor fill hole 402.

At step 3704, the liquor chamber 302 may be filled with liquor. The liquor chamber 302 may be filled through the liquor fill hole 402 in a configuration explained in conjunction with FIG. 5. Further, at step 3706, the mixer chamber 304 may be filled with a mixer.

At step 3708, a head assembly 204 may be provided. The head assembly 204 may include a liquor pump 1702 and a mixer pump 1704. The head assembly 204 may further include a turbulator 1708. The turbulator 1708 may include a turbulator liquor inlet 1714, a turbulator mixer inlet 1712, and a mixed drink outlet 1716. The liquor pump 1702 and the mixer pump 1704 may be fluidically connected to the turbulator 1708, the turbulator liquor inlet 1714, and the turbulator mixer inlet 1712 as explained in conjunction with FIGS. 17-18. The liquor pump 1702 may be in fluid communication with the liquor conduit 610, and the mixer pump 1704 may be in fluid communication with the mixer conduit 612. Using this fluid communication, the liquor pump 1702 and the mixer pump 1704 may be configured to draw and transmit the liquor and the mixer to the turbulator 1708. The turbulator 1708 may be configured to mix the liquor and the mixer, and it may be configured to transmit the mixed drink to the mixed drink outlet 1716. A nozzle 902 may be fluidically communicated with the mixed drink outlet 1716, and it may be configured to dispense the mixed drink received from the mixed drink outlet 1716. The head assembly 204 may further include an electronics circuit board. The electronics circuit board may be further connected to the liquor pump 1702 and the mixer pump 1704. The electronics circuit board may include a main circuit board 1802 connected to the liquor pump 1702 and the mixer pump 1704, and it may include a daughter circuit board 1804 connected to the main circuit board 1802. To the daughter circuit board 1804, a mix adjuster 802 may be connected. The mix adjuster 802 may be configured to adjust the ratio of the liquor and the mixer and to generate a sensor signal. The sensor signal may be processed by the daughter circuit board 1804 to generate at least one operational signal, and the daughter circuit board 1804 may transmit the operational signal to the main circuit board 1802.

At step 3710, the head assembly 204 may be attached to the container assembly 202 after the container assembly 202 may have been filled with liquor and mixer. The head assembly 204 may include a threaded collar 804 which may be rotated vertically downwards, and which may tighten the head assembly 204 onto the container assembly 202.

At step 3712, the ratio of the liquor and the mixer may be adjusted and set using the mix adjuster 802. The mix adjuster 802 may be further configured to generate the sensor signal representative of the set ratio of liquor to mixer. The sensor signal may be processed by the daughter circuit board 1804 to generate at least one operational signal, and the daughter circuit board 1804 may transmit the operational signal to the main circuit board 1802.

At step 3714, in response to the operational signal, the liquor pump 1702 and the mixer pump 1704 may be operated by the main circuit board 1802 to draw the liquor and the mixer in accordance with the ratio. As illustrated earlier, the liquor pump 1702 and the mixer pump 1704 may be configured to draw and transmit the liquor and the mixer from the container assembly 202 to the turbulator 1708.

At step 3716, the liquor and the mixer received in the turbulator 1708 may be combined to create a mixed drink. The mixed drink may be further transmitted to the nozzle 902 from the mixed drink outlet 1716 through the connector hose 2502 connecting the nozzle 902 and the mixed drink outlet 1716. At step 3718, the mixed drink may be discharged from the nozzle 902 in a laminar flow as illustrated by FIG. 1. At step 3720, the rate adjuster 814 may be used to increase the flow rate of the dispensed mixed drink.

In an alternative configuration, more than one chamber may be formed within the mixer chamber 304 in a fashion like that of the insertion of the liquor chamber 302 in the mixer chamber 304. This configuration may be beneficial for preparation of cocktails requiring multiple ingredients such as the 3-ingredient Negroni. It is well known that Negroni is a classic cocktail drink formed by mixing gin as liquor, sweet vermouth as a first mixer, and Campari as a second mixer in a ratio of 2:1:1. The mixer chamber 304 may be divided into separate chambers by inserting a second mixer chamber in the mixer chamber 304. Sweet vermouth may be poured into mixer chamber 304, and Campari may be poured into the second mixer chamber. Also, gin may be filled in liquor chamber 302. Such assemblies may also require additional mixer conduits corresponding to the mixer chambers inserted in the mixer chamber 304. Each of the mixer conduits may be further converged to form a single outlet. For example, in the case of Negroni preparation, two mixer conduits may be separately used for the second mixer chamber and the mixer chamber 304. A Y-shaped tube may be used to connect the distal ends of the two mixer conduits. The two mixer conduits may converge into one combined mixer outlet, thereby making no structural changes to the separator plate 406.

In another alternative configuration, the beverage dispenser 102 may be operated remotely using a user interactive device such as a mobile phone, laptop, personal computer, and the like. The user interactive device may include a web-based application or software which may further include a user interactive interface such as application-program-interfaces (APIs) for mobile phones. In this configuration, the main circuit board 1802 or the daughter circuit board 1804 may include a communication module (not shown in the figure) which may be configured to connect the beverage dispenser 102 to the user interactive devices. A communication may be established with the user interactive devices wirelessly using Wi-Fi, Bluetooth, or LTE connections. The user interactive interfaces may provide a variety of options for the user to select such as a ratio of liquor to mixer, powering ON/OFF the beverage dispenser 102, dispensing the mixed drink, etc. In another alternative configuration, the user interactive interfaces may be configured to display various recipes for cocktail drinks. Upon reading one of these, the user may change the liquor and the mixer and fill the container assembly 202 accordingly. The user interactive interfaces may also be configured to suggest a mix value.

In another alternative configuration, apart from indication by the LED array 1806, the beverage dispenser 102 may also include a sound-based alarm system. The alarm system may include level-audile alarms such as piezo-electric horns. Alarms may be triggered based on changes in operation of the beverage dispenser 102 such as the electric battery getting discharged, the complete dispensing of the mixed drink, etc.

In another alternative configuration, the beverage dispenser 102 may include an external mount. The external mount may be positioned on the container assembly 202 or the head assembly 204 (not illustrated by the figures). The external mount may enable the mounting of devices such as a laser sight that may be configured to identify targets into which the drink may be dispensed, especially in areas affected with low light.

In another alternative configuration, the beverage dispenser 102 may be configured wherein the dispense trigger 810 (FIG. 8) is configured to dispense a maximum amount of liquid per each press. In one configuration, momentary-press or long-press of the 810 may cause only 1.5 ounces of liquid to be mixed & dispensed.

With reference to FIGS. 38-45, an ornamental appearance of a container assembly 202 may include features as illustrated or may have various features not illustrated. For example, the internal components of the head assembly 204 and the container assembly 202 may not be illustrated, etc.

Figure 46:
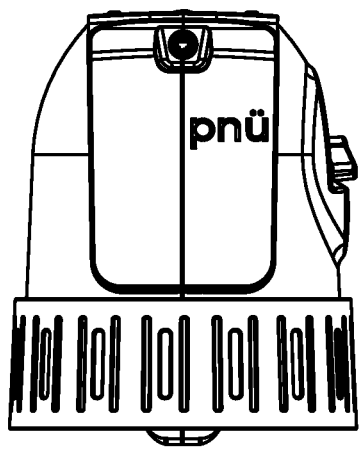
FIG. 46 illustrates a front view of the head assembly.
Figure 47:
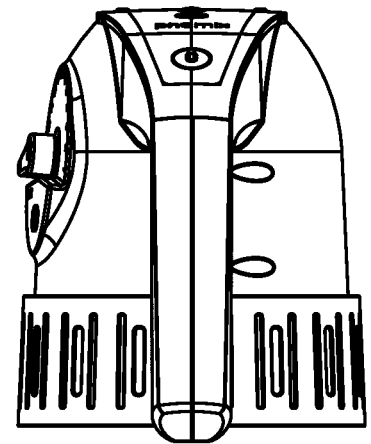
FIG. 47 illustrates a rear view of the head assembly of FIG. 46.
Figure 48:
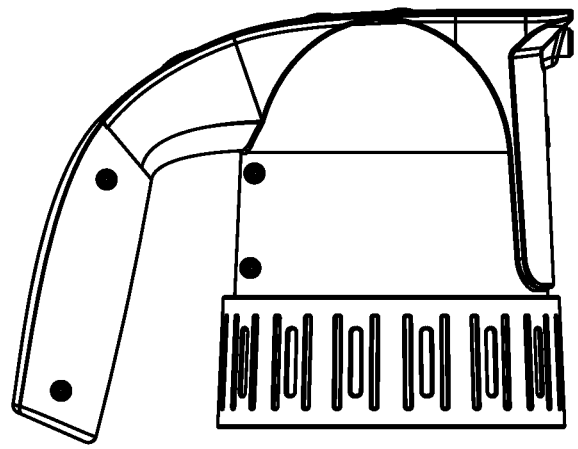
FIG. 48 illustrates a left view of the head assembly of FIG. 46.

With reference to FIGS. 46-48, an ornamental appearance of a container assembly 202 may include features as illustrated or may have various features not illustrated. For example, the internal components of the head assembly 204 and the container assembly 202 may not be illustrated, etc.

Figure 49:
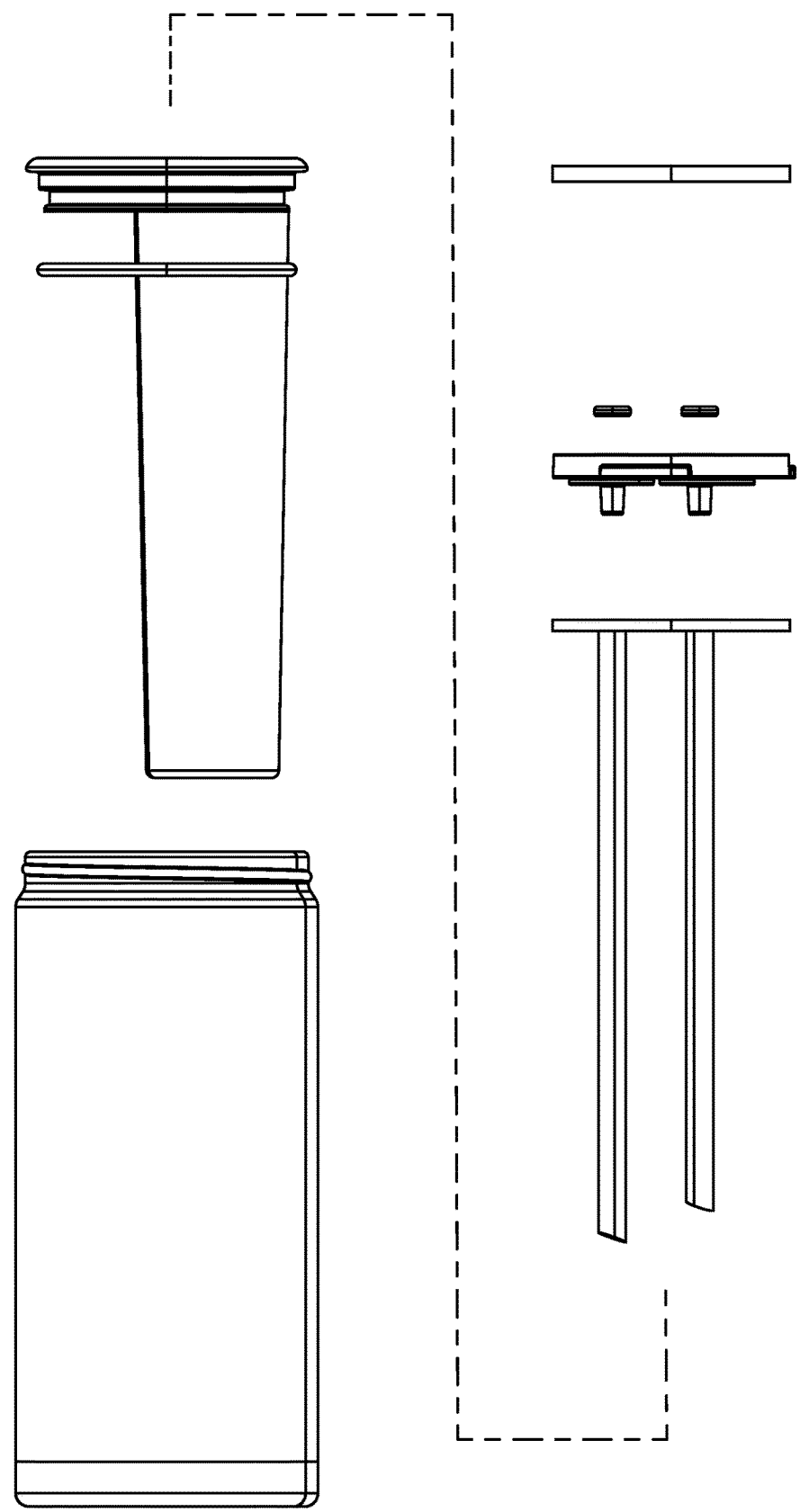
FIG. 49 illustrates a front-exploded view of the container assembly.
Figure 50:
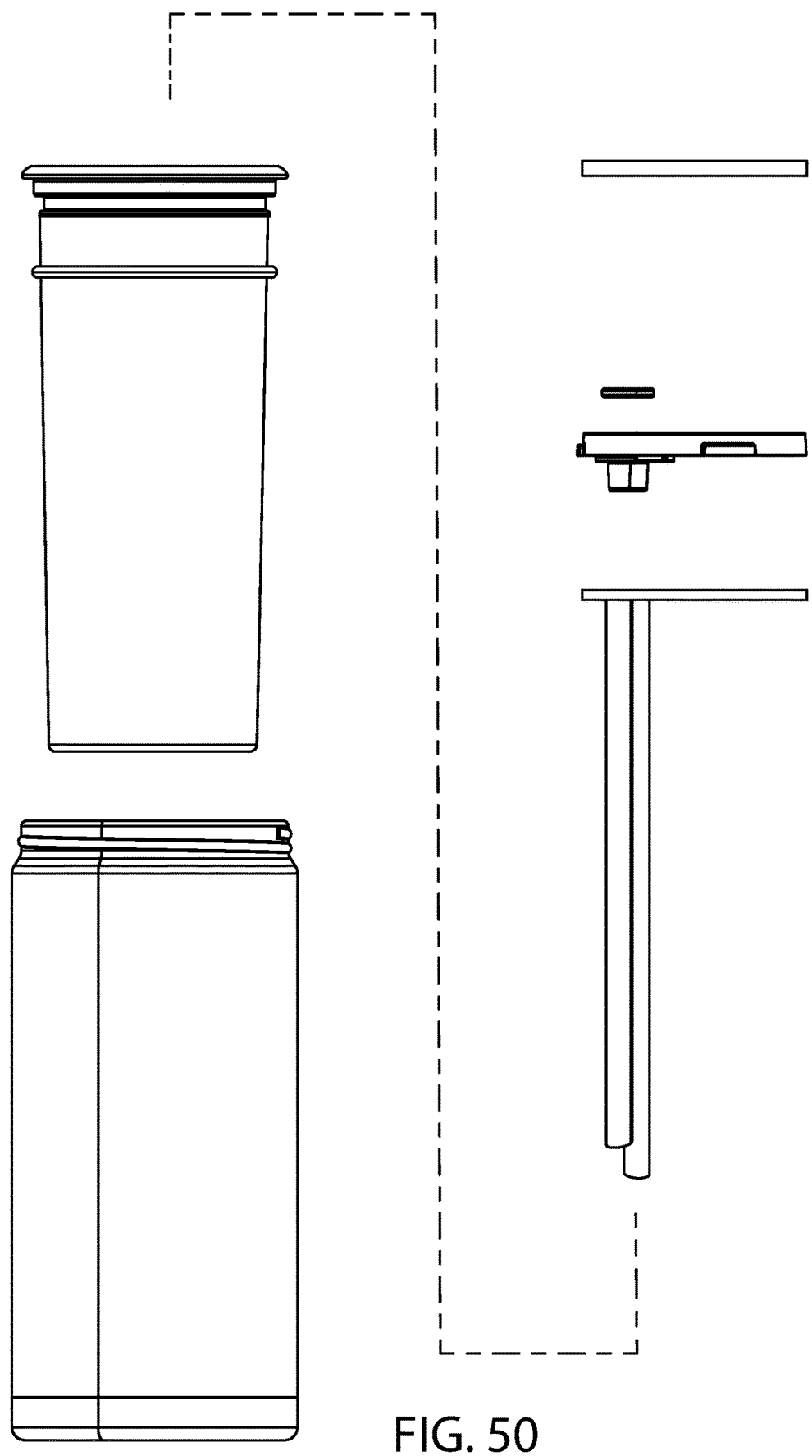
FIG. 50 illustrates a rear-exploded view of the container assembly of FIG. 49.
Figure 51:
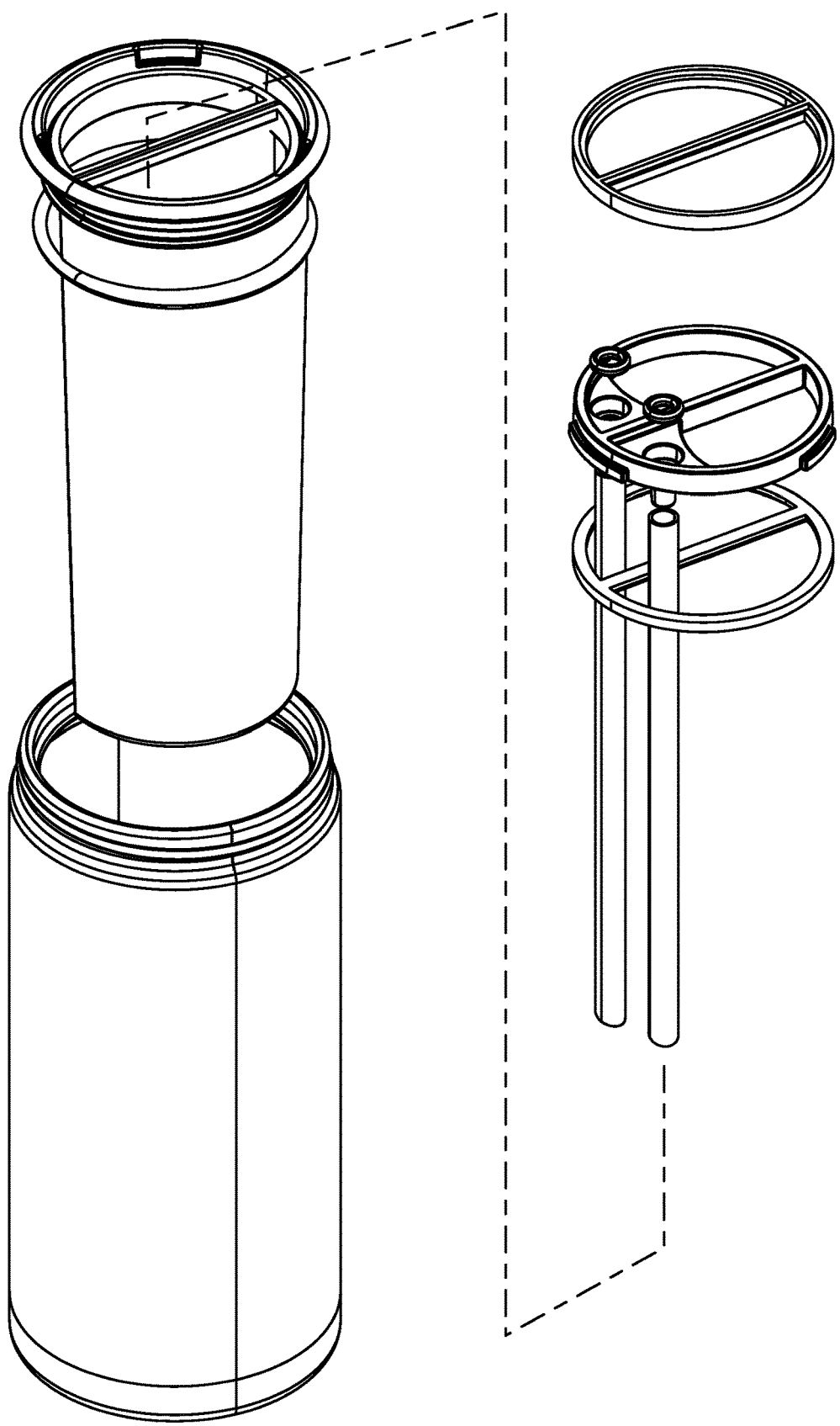
FIG. 51 illustrates an exploded view of the container assembly of FIG. 49.

With reference to FIGS. 49-51, an ornamental appearance of a container assembly 202 may include features as illustrated or may have various features not illustrated. For example, the internal components of the head assembly 204 and the container assembly 202 may not be illustrated, etc.

Figure 52:
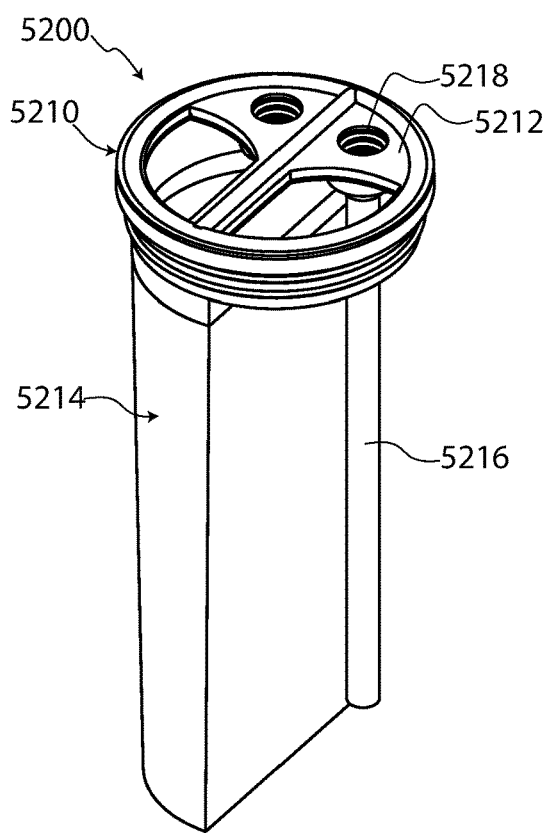
FIG. 52 illustrates a top perspective view of one configuration of an integrated liquor container.

With reference to FIG. 52 illustrating a top perspective view 5200 of an integrated liquor container 5210, the integrated liquor container 5210 may be formed with a separator plate 5212 integrally formed with part-of or all-of a liquor chamber 5214 (and other features/components such as the previously described bezel 620, top seal 602, bottom seal 608, various O-rings, etc.). In this configuration, the separator plate 5212 may be over-molded with various features. The over molding may be any of a variety of compounds such as thermoplastic urethane, thermoplastic rubber, thermosetting silicone (e.g. silicone 35-50 Shore A durometer). If required for manufacturing, the over-molding may be on the integrated liquor container 5210 and the liquor cup may be in 2-parts that are adhered (e.g. ultrasonically welded) together as best described in FIG. 54. A user may insert the integrated liquor container 5210 into the mixer chamber (e.g. mixer chamber 304 previously described herein) and silicone features would compressed against the bore 306 of the mixer chamber 304, the straws, the head assembly, etc. to provide a liquid-impervious seal(s). The user may then insert straws (e.g. mixer straw 5216) from a top-side and securely/sealingly held by silicone ports (e.g. mixer port 5218) that are backed by a rigid body of the separator plate 5212. The head assembly may be provided with a seal plate that seal against the separator plate 5212. This face seals against the top silicone face of the reservoir and the protrusions insert into the silicone ports, forming a seal against the sides of the protrusions. As the collar (e.g. threaded collar 804) is torqued into place, the silicone is compressed forming a seal around the perimeter of the seal plate and down the center divider between reservoirs as well as an additional vertical seal between the thermos and reservoir ring and an additional vertical seal between the pump nipples and straw ports. In one configuration, the straws may be slightly larger (e.g., 3/8"OD, 5/16" ID) to fit through the silicone ports without getting stuck, but the open surface area of the filter may need to be 15.9 mm^2 (the surface area of a 4.5 mm diameter circle) to not impede flow.

Figure 53:
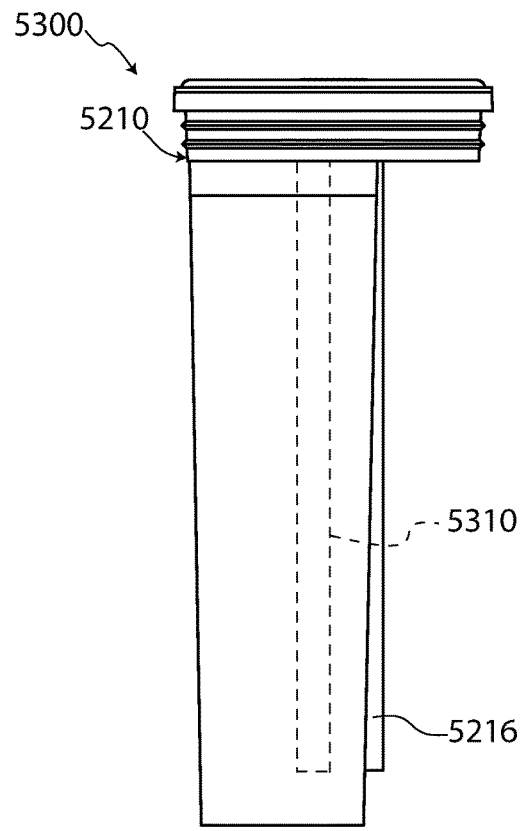
FIG. 53 illustrates a side elevation view of the integrated liquor container of FIG. 52.

With reference to FIG. 53 illustrating a side elevation view 5300 of the integrated liquor container 5210, the integrated liquor container 5210 maybe further provided with a liquor straw 5310 that is parallel to (and offset from) the mixer straw 5216.

Figure 54:
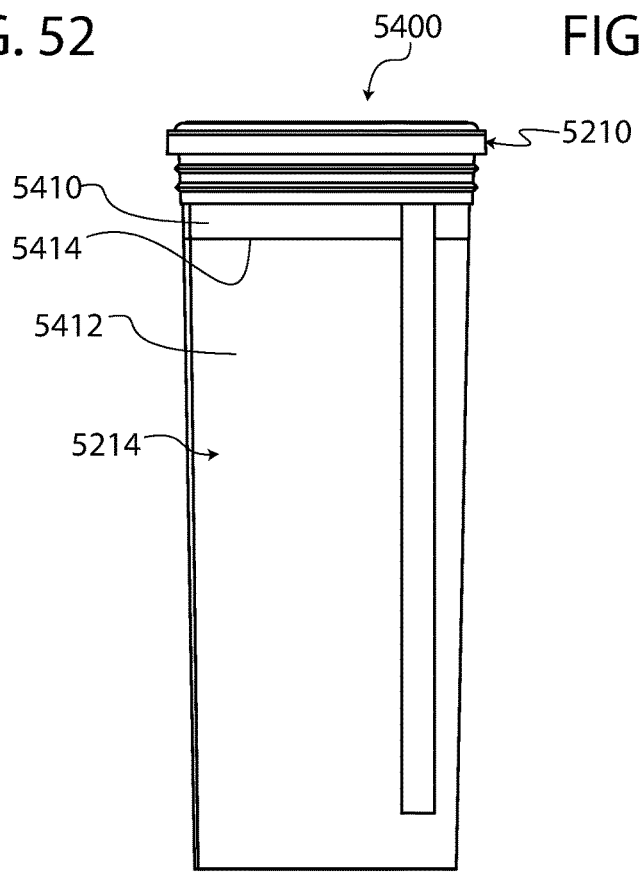
FIG. 54 illustrates a front elevation view of the integrated liquor container of FIG. 52.

With reference to FIG. 54 illustrating a front elevation view 5400 of the integrated liquor container 5210, the liquor chamber 5214 may be provided with a top 5410 and a bottom 5412 that are separated by a split 5414. In some configurations and with some manufacturing limitations, it is difficult to form all features of the integrated liquor container 5210 without splitting the part, such as the split 5414 separating the top 5410 from the bottom 5412. The bottom 5412 may be adhered to the top 5410 by any of a variety of methods such as ultrasonic welding, solvent welding, mechanical fastening, interface fit, etc.

Figure 55:
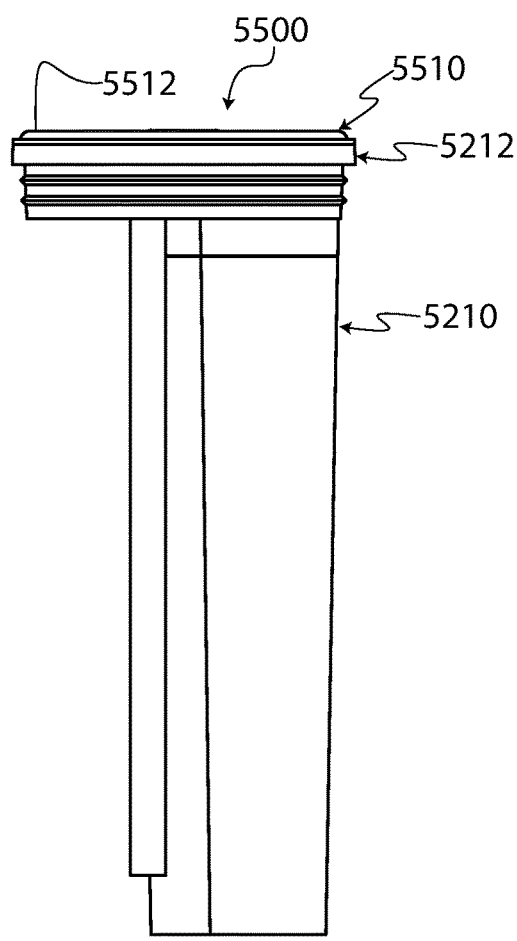
FIG. 55 illustrates a side elevation view of the integrated liquor container of FIG. 52.

With reference to FIG. 55 illustrating a side elevation view 5500 of the integrated liquor container 5210, the integrated liquor container 5210 may be provided with a plurality of overmolded features 5510 such as a top face seal 5512 formed on a top surface of the separator plate 5212.

Figure 56:
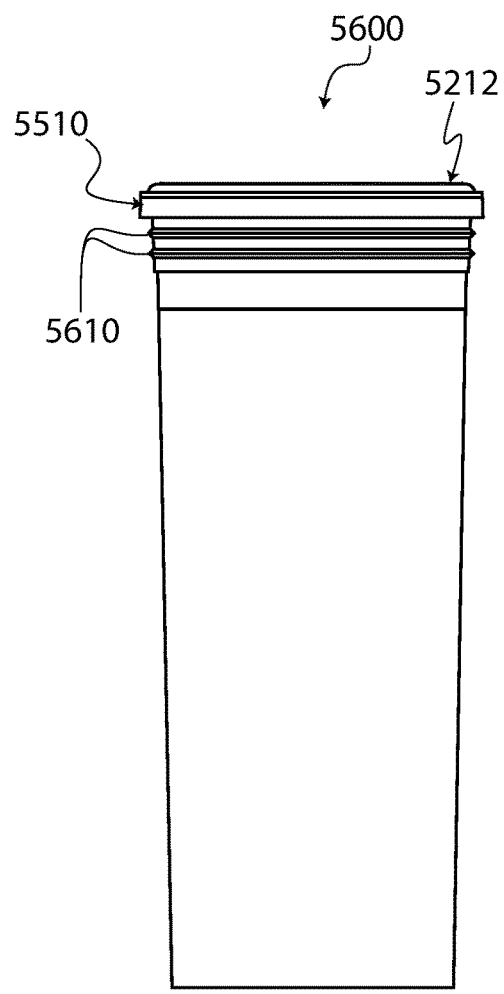
FIG. 56 illustrates a back elevation view of the integrated liquor container of FIG. 52.

With reference to FIG. 56 illustrating a back elevation view 5600 of the integrated liquor container 5210, the integrated liquor container 5210 may further include the overmolded features 5510 such as bore rings 5610. The bore rings 5610 may be slightly larger than the bore of the mixer container (previously described) in order to contain the liquid.

Figure 57:
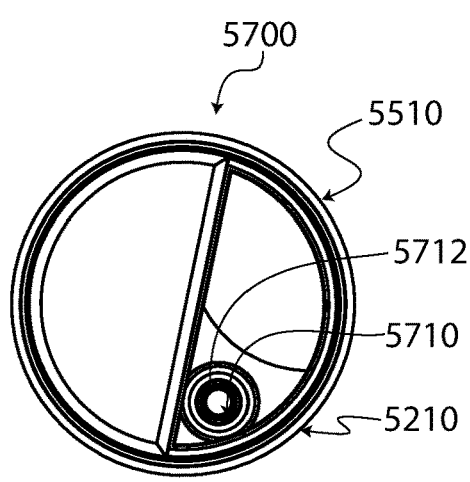
FIG. 57 illustrates a bottom plan view of the integrated liquor container of FIG. 52.

With reference to FIG. 57 illustrating a bottom plan view 5700 of the integrated liquor container 5210, the overmolded features 5510 may include a plurality of straw rings 5710. The straw rings 5710 may include mixer rings 5712.

Figure 58:
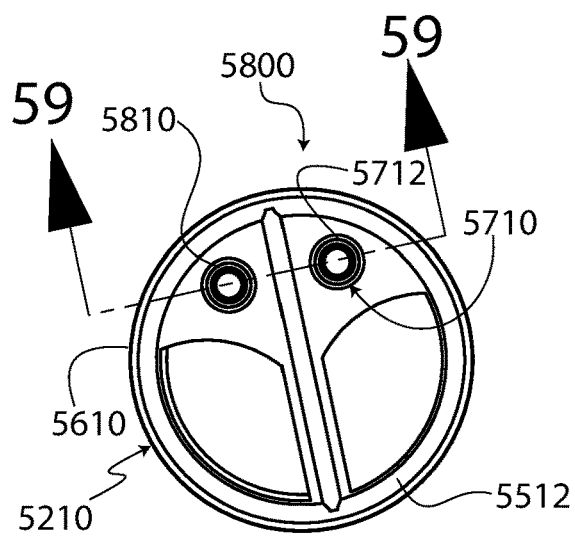
FIG. 58 illustrates a top plan view of the integrated liquor container of FIG. 52.

With reference to FIG. 58 illustrating a top plan view 5800 of the integrated liquor container 5210, the integrated liquor container 5210 may be provided with one or more of a liquor ring 5810 of the straw rings 5710. In a similar manner as the other overmolded features 5510, the liquor ring 5810 may be utilized to seal the liquor straw 5310 (FIG. 53) or protrusions from the head assembly that are in fluid communication with a pump.

Figure 59:
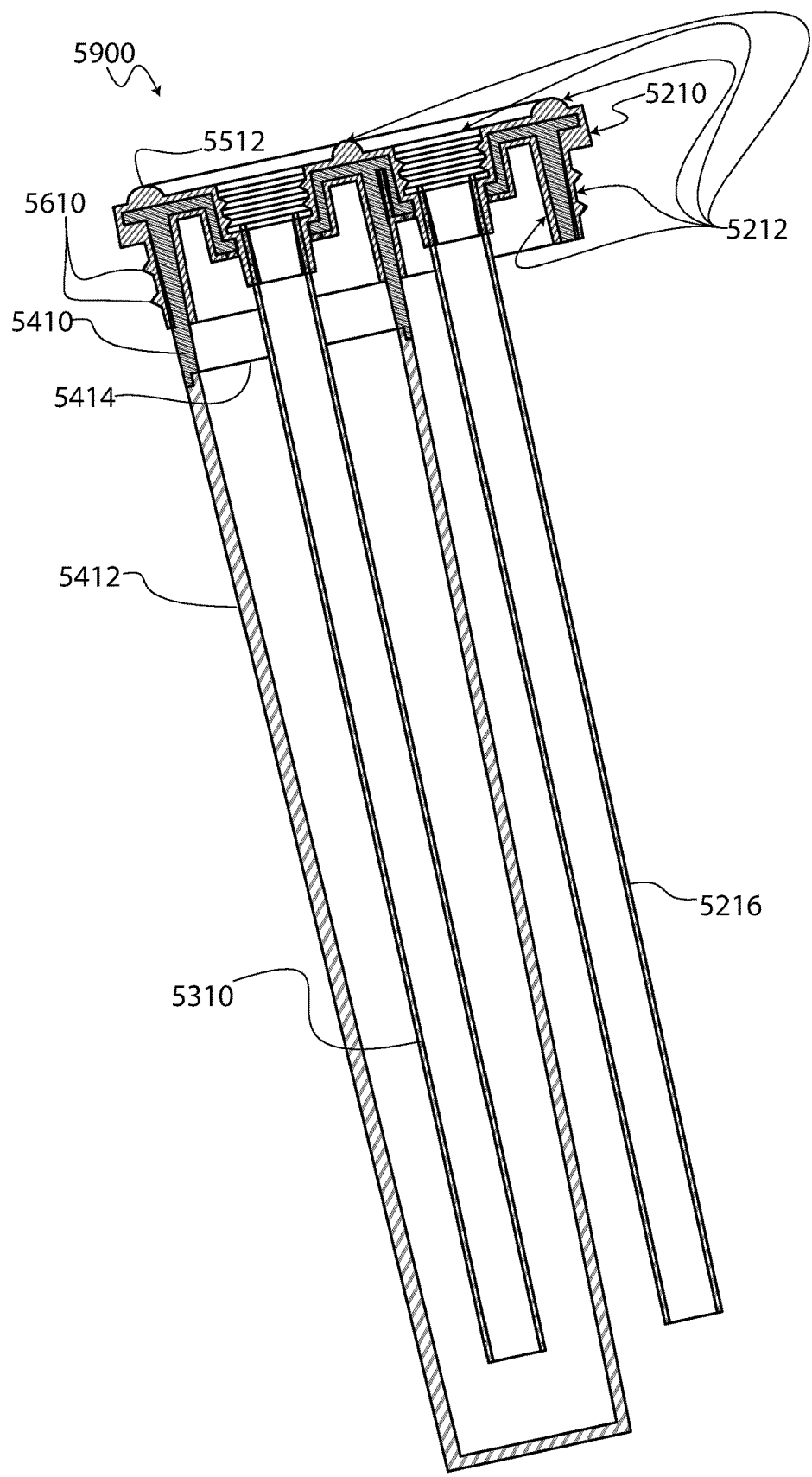
FIG. 59 illustrates a cross-sectional view of the integrated liquor container of FIG. 52 taken across plane 59-59 in FIG. 58.

With reference to FIG. 59 illustrating a cross-sectional view 5900 of the integrated liquor container 5210 taken across plane 59-59 in FIG. 58, the overmolded features 5510 may include the previously described bore rings 5610, the top face seal 5512, etc. The cross-sectional view 5900 also illustrates that the split 5414 may be formed with a rib for aligning the top 5410 to the bottom 5412.

In another configuration, the mixer container and the liquor container may be formed in a single container. While any of a larger variety of configurations could create this multi-chamber container, a fluid-impervious wall may be formed that divides a circular profile into two chambers. The wall may be inserted, molded, attached, etc. to create the two separate containers in an otherwise larger volume.

In another configuration, the beverage dispenser may include a container assembly and a head assembly to store liquor and a mixer, to mix the liquor and mixer together and to pass through one pump as it travels towards a nozzle. The ratio of mixer to liquor may be controlled by an adjuster configured, for example, as a needle valve, a pinch valve (e.g. against a compressible tube), or other method depending on the configuration. The ratio of the liquor and the mixer may be set once or variable and dispense continuously or for a set period of time. In a single pump configuration, a controller may be wired directly to the pump, a batter, and a trigger.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or +0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or +0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been described above in connection with specific apparatuses and methods, it is to be clearly understood that this description is made only by way of example and not as limitation on the scope of the disclosure.

What is claimed is:

1. A beverage dispenser configured to dispense a mixed drink of liquor and a mixer, the beverage dispenser comprising:
    a container assembly defining an opening, the container assembly comprising:
        a mixer chamber configured to store the mixer;
        a liquor chamber inserted within the mixer chamber, the liquor chamber configured to store the liquor;
        a separator plate adjacent to the opening of the container assembly, the separator plate comprising:
            a liquor fill hole in fluid communication with the liquor chamber;
            a liquor conduit defining:
                a proximal end; and
                a distal end oppositely disposed to the proximal end, wherein the proximal end of the liquor conduit is in fluid communication with the liquor chamber;
            a mixer fill hole in fluid communication with the mixer chamber; and
            a mixer conduit defining:
                a proximal end; and
                a distal end oppositely disposed to the proximal end,
    wherein the proximal end of the mixer conduit is in fluid communication with the mixer chamber; and
    a head assembly removably engaged to the container assembly, the head assembly comprising:
        a turbulator configured to combine the liquor and the mixer, the turbulator comprising:
            a liquor inlet;
            a mixer inlet; and
            a mixed drink outlet;
        a liquor pump in fluid communication with the proximal end of liquor conduit and the liquor inlet of the turbulator;
        a mixer pump in fluid communication with the proximal end of the mixer conduit and the mixer inlet of the turbulator;
        a nozzle in fluid communication with the mixed drink outlet; and
        an electronics circuit board in electrical communication with the liquor pump and the mixer pump, the electronics circuit board comprising:
            a mix adjuster, configured to adjust a ratio of the liquor and the mixer; and
            a battery configured to power the electronics circuit board, the liquor pump and the mixer pump,
            wherein the electronics circuit board is configured to:
                controllingly operate the liquor pump and the mixer pump to draw the liquor and the mixer from the liquor chamber and the mixer chamber, respectively,
                combine the liquor and the mixer in the turbulator, and
                dispense the mixed drink from the nozzle.

2. The beverage dispenser of claim 1, wherein the electronics circuit board comprises:
    a main circuit board in electrical communication with the liquor pump and the mixer pump; and
    a daughter circuit board in electrical communication with:
        the main circuit board, and
        the mix adjuster.

3. The beverage dispenser of claim 2, wherein the mix adjuster further comprises:
    a rotary input in electrical communication with the main circuit board via the daughter circuit board.

4. The beverage dispenser of claim 2 wherein the daughter circuit board further comprises:
    a charge port in electrical communication with the battery.

5. The beverage dispenser of claim 1, wherein the head assembly further comprises:
    a handle comprising:
        a protrusion from the head assembly, and
        a grip adjoining the protrusion; and
    a dispense trigger configured to dispense the mixed drink from the nozzle.

6. The beverage dispenser of claim 5 and further comprising:
    a rate adjuster configured to change a flow rate of the mixed drink from the nozzle; and a power switch configured to conserve power contained in the battery.

7. The beverage dispenser of claim 1, wherein the head assembly further comprises:
   a threaded collar configured to engage with the container assembly.

8. The beverage dispenser of claim 1, wherein the head assembly further comprises:
   a liquor protrusion formed in the head assembly, the liquor protrusion in fluid communication with the liquor pump; and
   a mixer protrusion formed in the head assembly, the mixer protrusion in fluid communication with the mixer pump,
   wherein coupling the head assembly to the container assembly is configured to:
      seal the liquor protrusion to the proximal end of the liquor conduit, and
      seal the mixer protrusion to the proximal end of the mixer conduit.

9. The beverage dispenser of claim 8, and further comprising:
   a liquor O-ring adjoining both the liquor protrusion and the proximal end of the liquor conduit; and
   a mixer O-ring adjoining both the mixer protrusion and the proximal end of the mixer conduit.

10. The beverage dispenser of claim 1, and further comprising:
    a clocking protrusion configured to align the head assembly to the container assembly, the clocking protrusion formed in either the head assembly or the separator plate of the container assembly; and
    a clocking receiver configured to receive the clocking protrusion, the clocking receiver formed in either the head assembly or the separator plate of the container assembly.

11. The beverage dispenser of claim 10, and further comprising:
    a seal between the clocking protrusion and the clocking receiver.

12. A beverage creation method for creating a mixed drink of liquor and a mixer, the beverage creation method comprising:
    providing a container assembly comprising:
       a mixer chamber configured to store the mixer, the mixer chamber comprising:
          an opening;
       a liquor chamber removably positioned in the mixer chamber, the liquor chamber configured to store the liquor; and
       a separator plate adjacent to the opening, the separator plate comprising:
          a liquor fill hole in fluid communication with the liquor chamber;
          a liquor conduit defining:
             a proximal end; and
             a distal end oppositely disposed to the proximal end, wherein the proximal end of the liquor conduit is in fluid communication with the liquor chamber;
          a mixer fill hole in fluid communication with the mixer chamber;
          a mixer conduit defining:
             a proximal end; and
             a distal end oppositely disposed to the proximal end,
          wherein the proximal end of the mixer conduit is in fluid communication with the mixer chamber;
    filling the liquor into the liquor chamber through the liquor fill hole;
    filling the mixer into the mixer chamber through the mixer fill hole;
    providing a head assembly comprising:
       a turbulator configured to combine the liquor and the mixer, the turbulator comprising:
          a liquor inlet;
          a mixer inlet; and
          a mixed drink outlet;
       a liquor pump in fluid communication with the proximal end of liquor conduit and the liquor inlet of the turbulator;
       a mixer pump in fluid communication with the proximal end of the mixer conduit and the mixer inlet of the turbulator;
       a nozzle in fluid communication with the mixed drink outlet;
       an electronics circuit board in electrical communication with the liquor pump and the mixer pump, the electronics circuit board comprising:
          a mix adjuster configured to adjust a ratio of the liquor and the mixer;
          a battery configured to power the electronics circuit board, the liquor pump and the mixer pump; and
          a trigger configured to activate the liquor pump and the mixer pump;
    attaching, after filling the liquor and the mixer, the head assembly to the container assembly;
    adjusting, using the mix adjuster, the ratio of the liquor and the mixer;
    operating, controllingly, in response to the ratio of the liquor and the mixer, the liquor pump and the mixer pump for drawing the liquor and the mixer from the liquor chamber and the mixer chamber, respectively;
    combining, the liquor and the mixer in the turbulator, for creating the mixed drink of the liquor and the mixer; and
    dispensing the mixed drink from the nozzle.

13. The beverage creation method of claim 12, wherein providing the head assembly further comprises:
    providing a main circuit board in electrical communication with the liquor pump and the mixer pump; and
    providing a daughter circuit board in electrical communication with:
       the main circuit board, and
       the mix adjuster;
    wherein adjusting the ratio comprises:
       communicating a ratio signal from the daughter circuit board to the main circuit board.

14. The beverage creation method of claim 13, further comprising:
    providing a charging port on the daughter circuit board;
    interfacing, electrically, the charging port to the battery; and
    charging the battery via the charging port.

15. The beverage creation method of claim 13, wherein providing the head assembly further comprises:
    providing a handle comprising:
       a protrusion from the head assembly; and
       a grip adjoining the protrusion;
       a dispense trigger configured to dispense the mixed drink from the nozzle;
       a rate adjuster configured to change a flow rate of the mixed drink from the nozzle; and
       a power switch configured to conserve power contained in the battery;

operating the liquor pump further comprises:
  communicating a trigger signal from the dispense trigger to the main circuit board.

16. The beverage creation method of claim 12, wherein providing the separator plate of the container assembly further comprises:
  providing a liquor protrusion in the head assembly, wherein the liquor protrusion is in fluid communication with the liquor pump; and
  providing a mixer protrusion in the head assembly, the mixer protrusion in fluid communication with the mixer pump;
  wherein attaching the head assembly to the container assembly is configured to:
    fluidically connect the liquor in the liquor chamber to the nozzle via the liquor protrusion, and
    fluidically connecting the mixer in the mixer chamber to the nozzle via the mixer protrusion.

17. The beverage creation method of claim 12, and further comprising:
  providing the separator plate of the container assembly further comprises:
    providing a clocking partition formed in either the head assembly or the separator plate of the container assembly;
    providing a clocking groove formed in either the head assembly or the separator plate of the container assembly; and
  aligning, before attaching, the head assembly to the container assembly with the clocking partition and the clocking groove.

18. The beverage creation method of claim 17, wherein providing the separator plate further comprises:
  providing a seal between the clocking partition and the clocking groove.

* * * * *